United States Patent
Tsubaki et al.

(10) Patent No.: US 12,333,752 B2
(45) Date of Patent: Jun. 17, 2025

(54) IMAGE PROCESSING APPARATUS AND METHOD, AND IMAGE CAPTURING APPARATUS AND CONTROL METHOD THEREOF, AND STORAGE MEDIUM

(71) Applicant: CANON KABUSHIKI KAISHA, Tokyo (JP)

(72) Inventors: Hidetoshi Tsubaki, Kanagawa (JP); Taisei Mori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 358 days.

(21) Appl. No.: 17/736,155

(22) Filed: May 4, 2022

(65) Prior Publication Data
US 2022/0358667 A1   Nov. 10, 2022

(30) Foreign Application Priority Data

May 7, 2021  (JP) ................. 2021-079246
May 14, 2021 (JP) ................. 2021-082597
Sep. 22, 2021 (JP) ................. 2021-154713
Mar. 28, 2022 (JP) ................. 2022-052478

(51) Int. Cl.
*G06T 7/593* (2017.01)
*G06T 5/00* (2024.01)
*G06T 5/73* (2024.01)
*H04N 13/282* (2018.01)
*H04N 13/296* (2018.01)

(52) U.S. Cl.
CPC ............... *G06T 7/593* (2017.01); *G06T 5/73* (2024.01); *H04N 13/282* (2018.05); *H04N 13/296* (2018.05)

(58) Field of Classification Search
CPC ......... G06T 7/593; G06T 5/73; H04N 13/296; H04N 13/282
See application file for complete search history.

(56) References Cited

U.S. PATENT DOCUMENTS

| 8,520,059 B2 | 8/2013 | Aoki |
| 9,088,718 B2 | 7/2015 | Tsubaki |
| 9,167,224 B2 | 10/2015 | Izawa |

(Continued)

FOREIGN PATENT DOCUMENTS

| CA | 2663084 | * | 9/2007 |
| CN | 101719286 A | | 6/2010 |

(Continued)

OTHER PUBLICATIONS

Kitahara, Translation of CA 2663084 Sep. 18, 2007 (Year: 2007).*

(Continued)

*Primary Examiner* — Zaihan Jiang
(74) *Attorney, Agent, or Firm* — Venable LLP

(57) ABSTRACT

An image processing apparatus comprises: an acquisition unit that acquires a plurality of different viewpoint images obtained by shooting a same scene from different viewpoints, and acquires at least one parallax image pair having parallax by pupil division; a first generator that generates a first distance image from the parallax image pair; a second generator that generates a second distance image from the plurality of different viewpoint images; and an integrator that integrates the first distance image and the second distance image and generates an integrated distance image.

22 Claims, 25 Drawing Sheets

(56) References Cited

U.S. PATENT DOCUMENTS

| | | | |
|---|---|---|---|
| 10,547,824 B2 | 1/2020 | Tanaka | |
| 10,679,326 B2 | 6/2020 | Tanaka | |
| 11,044,453 B2 | 6/2021 | Tanaka | |
| 2010/0328456 A1* | 12/2010 | Alakarhu | G06T 5/80 348/139 |
| 2011/0242273 A1* | 10/2011 | Shimaya | G06T 7/97 348/36 |
| 2013/0010078 A1 | 1/2013 | Aoki | |
| 2013/0194390 A1 | 8/2013 | Hirooka | |
| 2014/0341285 A1* | 11/2014 | Sakurai | H04N 13/161 375/240.12 |
| 2015/0009299 A1 | 1/2015 | Izawa | |
| 2017/0148137 A1 | 5/2017 | Tanaka | |
| 2017/0295355 A1 | 10/2017 | Tanaka | |
| 2018/0007285 A1 | 1/2018 | Fang | |
| 2018/0184013 A1 | 6/2018 | Hamano et al. | |
| 2018/0316909 A1 | 11/2018 | Tsubaki | |
| 2019/0128669 A1 | 5/2019 | Nobayashi | |
| 2019/0166349 A1* | 5/2019 | Park | G06T 3/14 |
| 2019/0166350 A1* | 5/2019 | Park | H04N 13/156 |
| 2020/0120323 A1 | 4/2020 | Tanaka | |
| 2020/0326609 A1 | 10/2020 | Tsubaki | |
| 2020/0366882 A1 | 11/2020 | Okuzawa | |

FOREIGN PATENT DOCUMENTS

| | | |
|---|---|---|
| CN | 104221370 A | 12/2014 |
| CN | 107637067 * | 6/2016 |
| JP | 2005-257278 A | 9/2005 |
| JP | 2011-112507 A | 6/2011 |
| JP | 2012-122911 A | 6/2012 |
| JP | 5192096 B2 | 5/2013 |
| JP | 2014-215261 A | 11/2014 |
| JP | 2016-085637 A | 5/2016 |
| JP | 2017-103756 A | 6/2017 |
| JP | 2020-021126 A | 2/2020 |
| JP | 2020-191624 A | 11/2020 |

OTHER PUBLICATIONS

Horikawa Translation of CN 107637067 Jun. 1, 2016 (Year: 2016).*
Nov. 29, 2022 Indian Official Action in Indian Patent Appln. No. 202244025968.
Nov. 1, 2022 Search Report in Great Britain Patent Appln. No. 2206275.6.
Sep. 20, 2023 United Kingdom Official Action in United Kingdom Patent Appln. No. GB2206275.6.
"Accurate, Dense, and Robust Multiview Stereopsis", IEEE Transactions Pattern Analysis and Machine Intelligence, 32(8), pp. 1362-1376 by Furukawa et al. (2010).
"Defocus Deblurring Using Dual-Pixel Data", ECCV2020, Abdullah Abuolaim et al. (2020).
"Dual Pixel Exploration: Simultaneous Depth Estimation and Image Restoration" , CVPR2021, Liyuan Pan et al. (2020).
"Modeling Defocus-Disparity in Dual-Pixel Sensors ", ICCP2020, Abhijith Punnappurath et al. (2020).
Jul. 29, 2024 Chinese Official Action in Chinese Patent Appln. No. 202210487575.5.
Jan. 3, 2025 Chinese Official Action in Chinese Patent Appln. No. 202210487575.5.

* cited by examiner

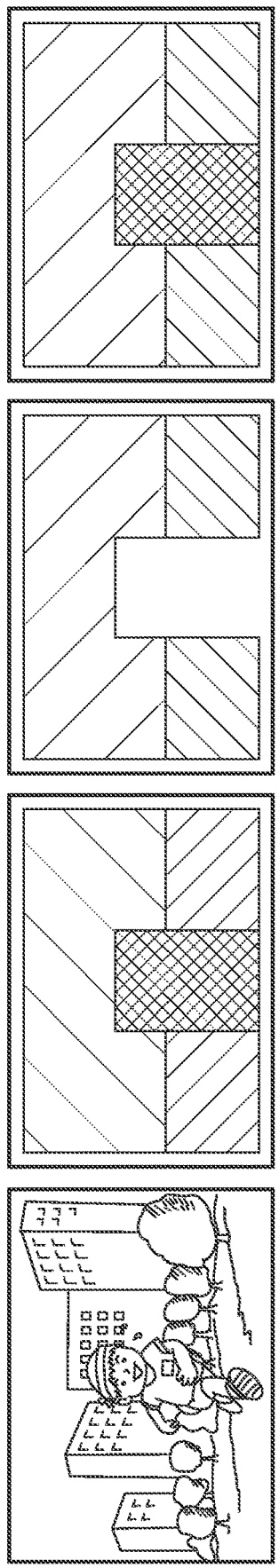

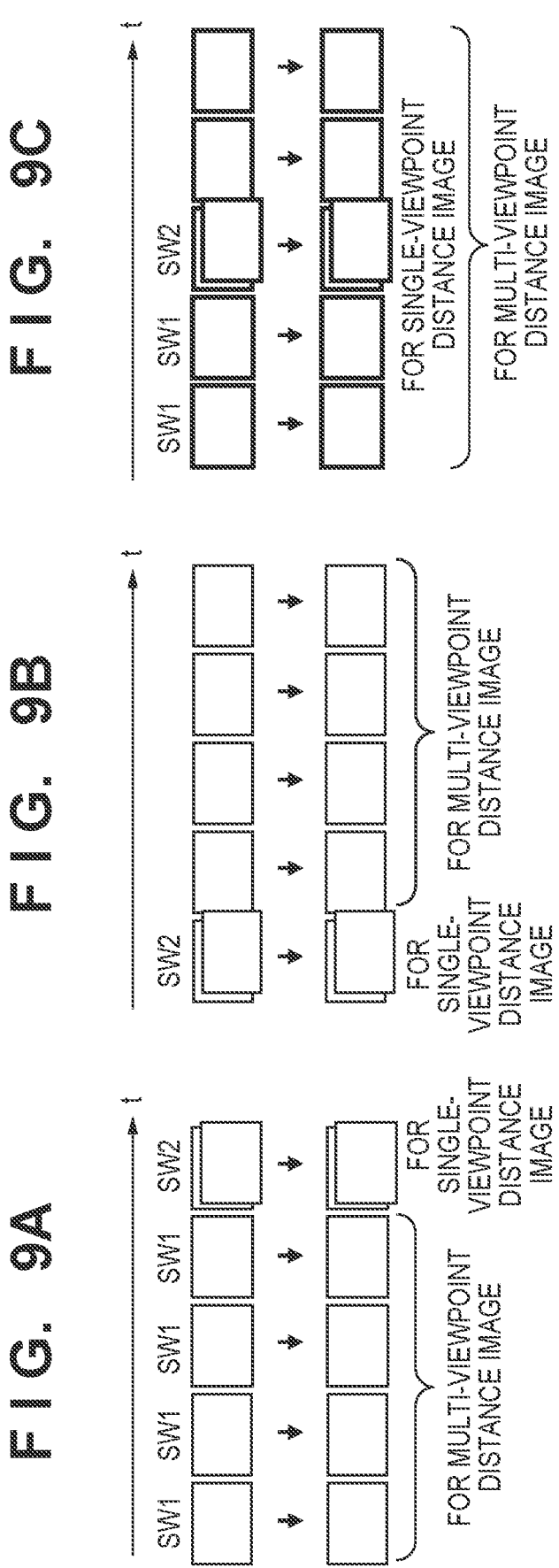

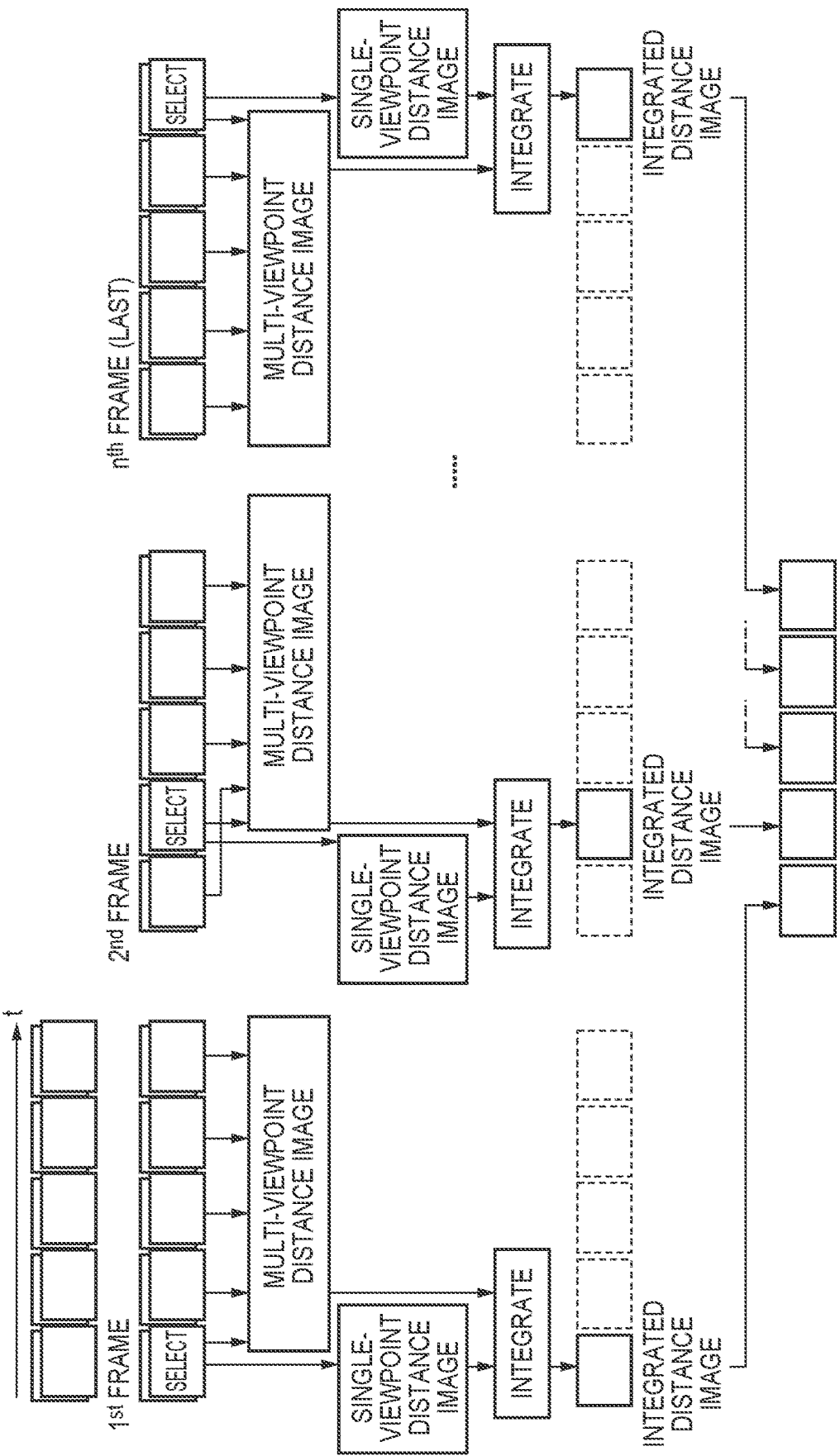

IMAGE PROCESSING APPARATUS AND METHOD, AND IMAGE CAPTURING APPARATUS AND CONTROL METHOD THEREOF, AND STORAGE MEDIUM

BACKGROUND OF THE INVENTION

Field of the Invention

The present invention relates to an image processing apparatus and method, and image capturing apparatus and control method thereof, and storage medium, and more particularly to a technique for generating a distance image from an image obtained from an image capturing apparatus.

Description of the Related Art

Conventionally, there is known a technique for obtaining a distance image showing a distance to each subject included in an image by using a pair of pupil-divided images (Japanese Patent No. 5192096). This technique has an advantage that a distance image of a scene, including not only a subject which is not moving (hereinafter referred to as "stationary subject") but also a subject which is moving (hereinafter referred to as "moving subject") and is the main subject in many shooting scenes, can be obtained by performing one shooting.

In addition, a compound-eye stereo camera has been used for a long time as a camera for distance measurement. The compound-eye stereo camera uses a plurality of cameras whose positional relationship between the cameras is known, and calculates the distance to a subject that exists in captured images in common based on the parallax of the subject in the images and the baseline length between the cameras. However, in a compound-eye camera having a short baseline length, if a subject exists at a long distance, the parallax of the subject in captured images is small, and the distance measurement accuracy becomes low.

On the other hand, in a monocular stereo camera, one camera captures a plurality of images while changing its position and posture, and the relative distance to the subject is calculated from the parallax of the same subject in those images. Since a monocular stereo camera can take a long baseline length, it is possible to calculate the relative distance accurately even for a subject at a long distance, and it is possible to improve the distance measurement accuracy by using a large number of images of tens to hundreds.

However, in a monocular stereo camera, since the distance to the subject and the position and posture of the camera are estimated at the same time, the distance measurement value is not uniquely determined, and the obtained distance measurement value is not an absolute distance value but a relative distance value.

Here, the relative distance value is a dimensionless quantity, and is defined as, for example, a ratio of distance to a subject of interest when a distance to a specific subject is defined as 1. On the other hand, the absolute distance value has a dimension of length, and is a value such as 3 [m].

Therefore, in a distance measuring apparatus equipped with both a monocular stereo camera and a compound-eye stereo camera, a technique for converting the relative distance value acquired by the monocular stereo camera into an absolute distance value using the information obtained by the compound-eye stereo camera is known. For example, in Japanese Patent Laid-Open No. 2011-112507, an absolute distance value to a subject is obtained by a compound-eye stereo camera, an absolute position and posture of the camera are calculated from the absolute distance value, and absolute distance values to all subjects are calculated using the absolute position and posture of the camera.

However, the above-described prior art disclosed in Japanese Patent No. 5192096 has the following problems. That is, since the baseline length between the main pixel and the sub-pixel for acquiring a pair of pupil-divided images is short, it is not possible to accurately calculate the distance to a subject in the images if the subject is not at a short distance from the image capturing apparatus and if the subject is outside a predetermined range from the in-focus distance. On the other hand, if the pupil is widened in order to lengthen the baseline length so that the distance to the subject can be measured with a better accuracy with the configuration shown in Japanese Patent No. 5192096, the depth of field becomes shallow, conversely, and the range of distance that can be calculated is narrowed. As described above, in a case where the depth of the shooting scene is deep, it is difficult to obtain an accurate distance image.

Further, according to the method described in Japanese Patent Laid-Open No. 2011-112507, if the absolute distance to the subject acquired by the compound-eye stereo camera is inaccurate, the absolute position and posture of the camera cannot be calculated accurately. As a result, there is a problem that the absolute distance values to all subjects become inaccurate.

SUMMARY OF THE INVENTION

The present invention has been made in consideration of the above situation, and acquires a distance image of an entire scene including a moving subject with high accuracy.

Further, according to another configuration of the present invention, a relative distance value acquired by a monocular camera is accurately converted into an absolute distance value.

According to the present invention, provided is an image processing apparatus comprising one or more processors and/or circuitry which functions as: an acquisition unit that acquires a plurality of different viewpoint images obtained by shooting a same scene from different viewpoints, and acquires at least one parallax image pair having parallax by pupil division; a first generator that generates a first distance image from the parallax image pair; a second generator that generates a second distance image from the plurality of different viewpoint images; and an integrator that integrates the first distance image and the second distance image and generates an integrated distance image.

Further, according to the present invention, provided is an image capturing apparatus comprising: an image processing apparatus comprising one or more processors and/or circuitry which functions as: an acquisition unit that acquires a plurality of different viewpoint images obtained by shooting a same scene from different viewpoints, and acquires at least one parallax image pair having parallax by pupil division; a first generator that generates a first distance image from the parallax image pair; a second generator that generates a second distance image from the plurality of different viewpoint images; and an integrator that integrates the first distance image and the second distance image and generates an integrated distance image; and an image sensor that shoots the at least one parallax image pair at least as part of the acquisition unit.

Furthermore, according to the present invention, provided is an image processing method comprising: acquiring a plurality of different viewpoint images obtained by shooting a same scene from different viewpoints, and acquiring at least one parallax image pair having parallax by pupil division; generating a first distance image from the parallax image pair; generating a second distance image from the plurality of different viewpoint images; and integrating the first distance image and the second distance image to generate an integrated distance image.

Further, according to the present invention, provided is a non-transitory computer-readable storage medium, the storage medium storing a program that is executable by the computer, wherein the program includes program code for causing the computer to executes an image processing method comprising: acquiring a plurality of different viewpoint images obtained by shooting a same scene from different viewpoints, and acquiring at least one parallax image pair having parallax by pupil division; generating a first distance image from the parallax image pair; generating a second distance image from the plurality of different viewpoint images; and integrating the first distance image and the second distance image to generate an integrated distance image.

Further, according to the present invention, provided is an image capturing apparatus comprising: at least two imaging units, wherein a distance between optical axes of the imaging units is known; and one or more processors and/or circuitry which functions as a calculator configured to calculate, based on a plurality of first images simultaneously shot by the imaging units and having parallax to each other, a plurality of absolute distance values to a subject and their reliabilities, and calculate, based on a plurality of second images shot at different times by the imaging units and having parallax to each other, a plurality of relative distance values to a subject and their reliabilities, wherein the calculator finds a conversion relationship between the absolute distance values and the relative distance values using an absolute distance value and a relative distance value having relatively high reliability and corresponding to substantially a same area of a subject among the plurality of absolute distance values and the plurality of relative distance values.

Further, according to the present invention, provided is a control method of an image capturing apparatus having at least two imaging units, wherein a distance between optical axes of the imaging units is known, the method comprising: calculating, based on a plurality of first images simultaneously shot by the imaging units and having parallax to each other, a plurality of absolute distance values to a subject and their reliabilities, and calculating, based on a plurality of second images shot at different times by the imaging units and having parallax to each other, a plurality of relative distance values to a subject and their reliabilities, wherein a conversion relationship between the absolute distance values and the relative distance values is found using an absolute distance value and a relative distance value having relatively high reliability and corresponding to substantially a same area of a subject among the plurality of absolute distance values and the plurality of relative distance values.

Further, according to the present invention, provided is a non-transitory computer-readable storage medium, the storage medium storing a program that is executable by the computer, wherein the program includes program code for causing the computer to executes a control method of an image capturing apparatus having at least two imaging units, wherein a distance between optical axes of the imaging units is known, the method comprising: calculating, based on a plurality of first images simultaneously shot by the imaging units and having parallax to each other, a plurality of absolute distance values to a subject and their reliabilities, and calculating, based on a plurality of second images shot at different times by the imaging units and having parallax to each other, a plurality of relative distance values to a subject and their reliabilities, wherein a conversion relationship between the absolute distance values and the relative distance values is found using an absolute distance value and a relative distance value having relatively high reliability and corresponding to substantially a same area of a subject among the plurality of absolute distance values and the plurality of relative distance values.

Further features of the present invention will become apparent from the following description of embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 7A-7D are diagrams showing an example for integrating a single-viewpoint distance image and a multi-viewpoint distance image according to the first embodiment.

FIGS. 9A-9C are diagrams illustrating an example of variation in shooting timing according to the first embodiment.

FIGS. 12A and 12B are diagrams for explaining selection of shots for generating a single-viewpoint distance image during post-processing according to the second embodiment.

DESCRIPTION OF THE EMBODIMENTS

Figure 1:
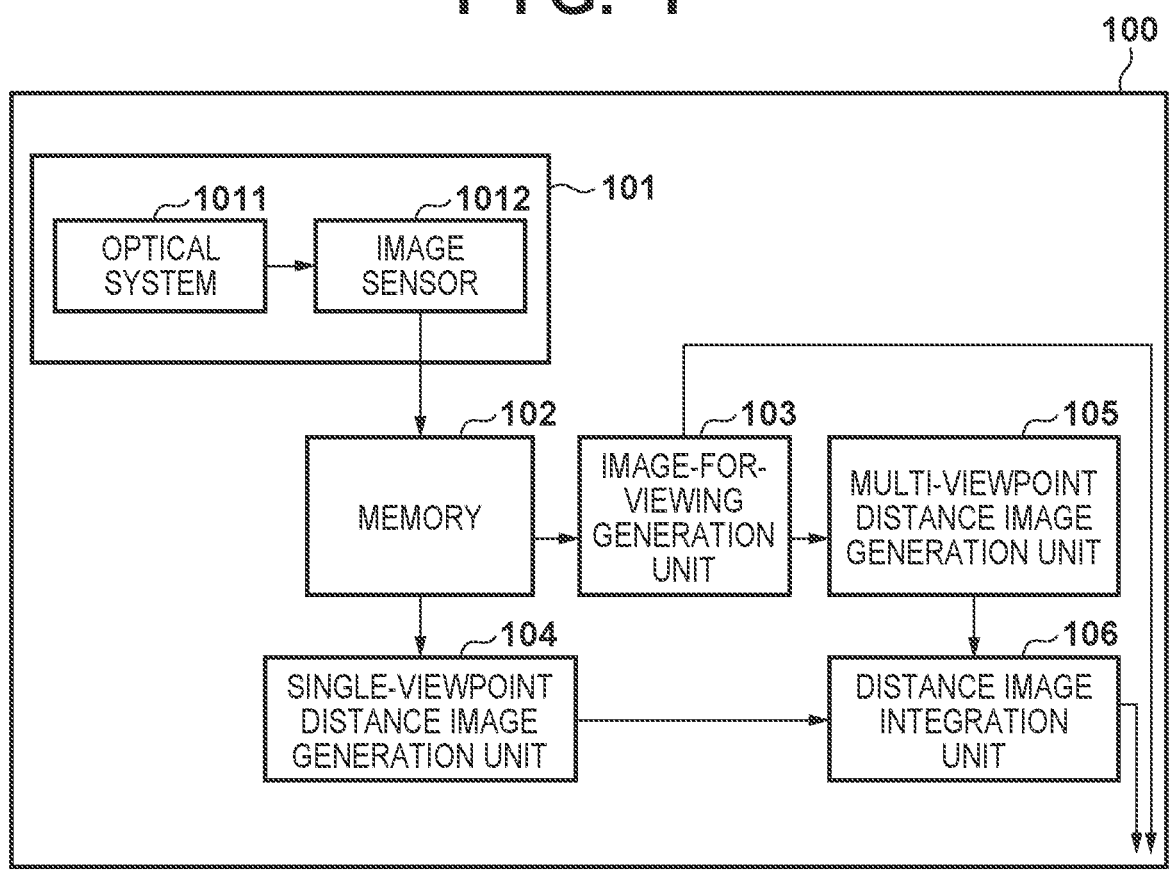
FIG. 1 is a block diagram showing a schematic configuration of an image capturing apparatus according to a first embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted. Each of the embodiments of the present invention described below can be implemented solely or as a combination of a plurality of the embodiments or features thereof where necessary or where the combination of elements or features from individual embodiments in a single embodiment is beneficial.

First Embodiment

FIG. 1 is a block diagram showing a schematic configuration of an image capturing apparatus 100 according to a first embodiment of the present invention, and shows only the components necessary for the description of the present invention. The image capturing apparatus 100 includes an image sensing unit 101 including an optical system 1011 and an image sensor 1012, a memory 102, an image-for-viewing generation unit 103, a single-viewpoint distance image generation unit 104, a multi-viewpoint distance image generation unit 105, and a distance image integration unit 106.

FIGS. 2A to 2E are diagrams for explaining the image sensing unit 101.

Figure 2A:
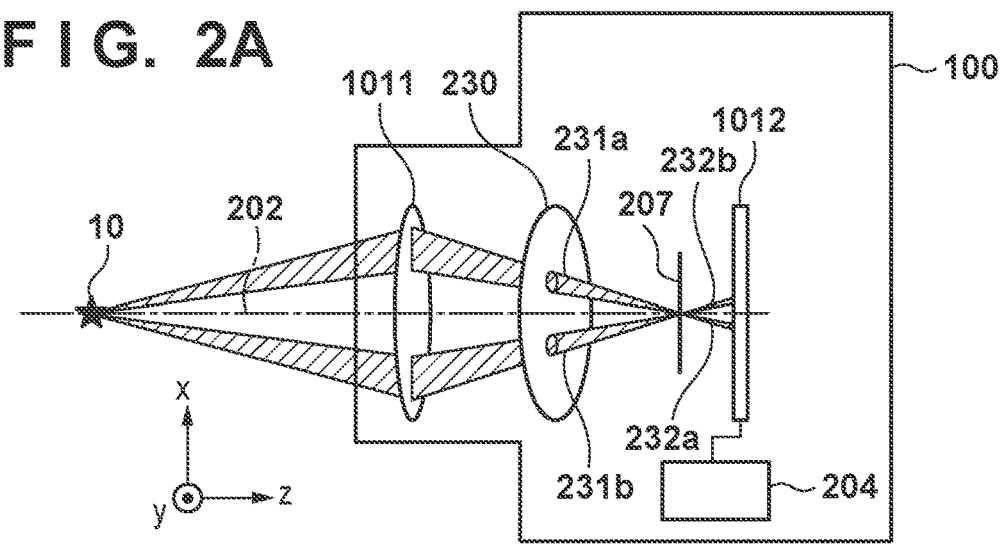
FIGS. 2A to 2E are views for explaining an image sensing unit according to the first embodiment.

In FIG. 2A, the optical system 1011 is composed of a plurality of lenses, mirrors, and the like, and forms an image of the reflected light from a subject 10 on a light receiving surface of the image sensor 1012. In FIG. 2A, the optical system 1011 is shown by a single lens. Reference numeral 202 denotes an optical axis of the optical system 1011. The image sensor 1012 receives an optical image of the subject 10 formed by the optical system 1011, converts it into an electric signal, and outputs it.

Figure 2B:
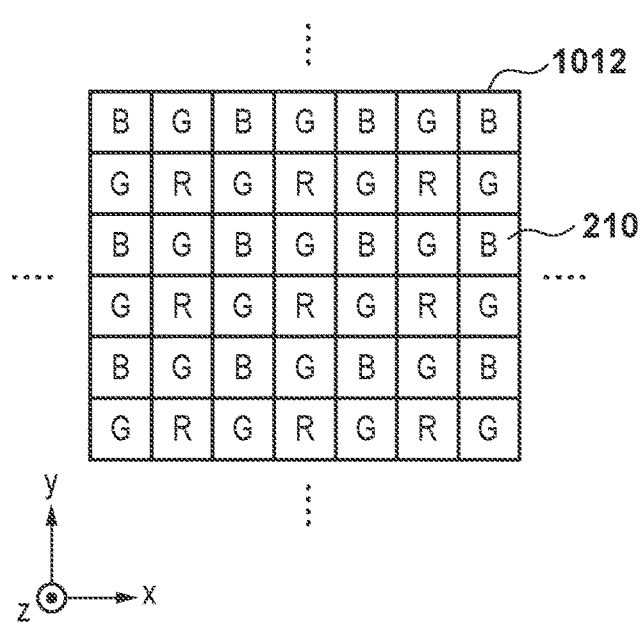

As shown in FIG. 2B, the image sensor 1012 has a large number of pixels 210 arranged in two dimensions and covered with so-called Bayer-arranged color filters 222 of red (R), green (G), and blue (B), which will be described later, arranged on an x-y plane. With this arrangement, each pixel of the image sensor 1012 is given spectral characteristics according to the wavelength band of light transmitted through the color filter 222, and outputs a signal mainly corresponding to either of red, green, or blue light.

Figure 2C:
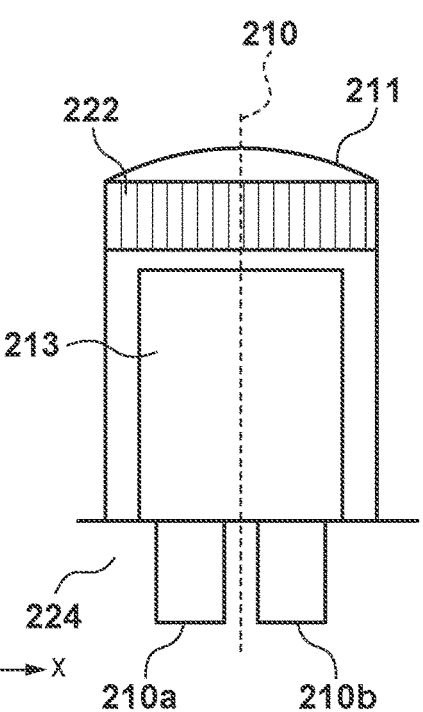

FIG. 2C is a cross-sectional view showing the configuration of each pixel, and includes a microlens 211, a color filter 222, photoelectric conversion portions 210a and 210b, and an optical waveguide 213. A substrate 224 is made of a material that absorbs light in the wavelength band transmitted through the color filter 222, for example, silicon (Si), and the photoelectric conversion portions 210a and 210b are formed in at least a part of an internal region of the substrate 224 by ion implantation or the like. Further, each pixel includes wiring (not shown).

On the photoelectric conversion portions 210a and 210b, a luminous flux 232a that has passed through a first pupil region 231a and a luminous flux 232b that has passed through a second pupil region 231b are incident, respectively, with the first pupil region 231a and the second pupil region 231 being different pupil regions of the exit pupil 230 of the optical system 1011. As a result, a first signal and a second signal which are pupil divided signals can be obtained from each pixel 210. The first signal and the second signal, which are the signals from the photoelectric conversion portions 210a and 210b, respectively, may be independently read out from each pixel 210. Alternatively, after reading out the first signal, a signal obtained by adding the first signal and the second signal may be read out, and the first signal may be subtracted from the added signal to obtain the second signal.

Figure 2D:
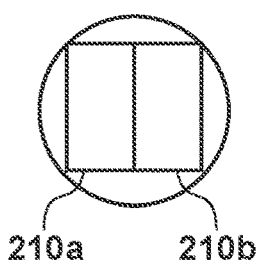
Figure 2E:
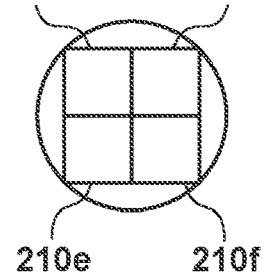

FIG. 2D is a diagram showing the arrangement of the photoelectric conversion portions 210a and 210b corresponding to each microlens 211 on the image sensor 1012 as viewed from the light incident direction along the optical axis, and showing an example that each pixel is divided horizontally or vertically. The present invention is not limited to this, and the pixels divided in the horizontal direction and the pixels divided in the vertical direction may be mixed. By arranging in such a manner, it is possible to accurately obtain the defocus amount described later not only for a subject whose brightness distribution changes in the horizontal direction but also for a subject whose brightness distribution changes in the vertical direction. Further, three or more photoelectric conversion portions may be formed with respect to each microlens 211, and FIG. 2E shows, as an example, a case where one pixel has four photoelectric conversion portions 210c to 210f divided in the horizontal and vertical directions.

The first signal and the second signal obtained from the photoelectric conversion portions 210a and 210b are sent to an arithmetic processing unit 204 included in the image sensing unit 101 and converted into electronic information. When the signal acquired by photoelectric conversion is an analog signal, the arithmetic processing unit 204 performs basic processing such as noise reduction by correlated double sampling (CDS), exposure control using gain in auto gain control (AGC), black level correction, and A/D conversion, and obtains an image signal converted into a digital signal. Since the arithmetic processing unit 204 mainly performs preprocessing on analog signals, these arithmetic processes are also generally called AFE (analog front end) processes. When used in combination with a digital output sensor, it may be called DFE (digital front end) processing.

Then, an image A formed by collecting first signals output from the plurality of pixels 210 of the image sensor 1012 and an image B formed by collecting second signals output from the plurality of pixels 210 are generated. Since the A image and the B image are images having parallax with each other, hereinafter, each of them is referred to as a "parallax image", and the A image and the B image are collectively referred to as a "parallax image pair".

If the image sensor 1012 is a color sensor, the arithmetic processing unit 204 also performs Bayer array interpolation and the like. Further, in order to improve the quality of the parallax images and the quality of the image for viewing, described later, which is output together with the parallax image pair, filtering processing such as low-pass and high-pass filter processing and sharpening processing may be performed. Further, various processes such as gradation correction including dynamic range expansion such as HDR (high dynamic range) processing and color tone correction such as WB (white balance) correction may be performed. Note that the processing of the arithmetic processing unit 204 tends to be integrated with the processing performed in the image sensor 1012 at the chip level or the unit level, so it is not shown in FIG. 1.

In this way, by forming a plurality of photoelectric conversion portions under each of the plurality of microlenses 211 formed on the light receiving surface of the image sensor 1012, the plurality of photoelectric conversion portions receive light fluxes of the subject that have passed through different pupil regions of the optical system 1011, respectively. This makes it possible to obtain a parallax image pair by one shooting operation even if the optical system 1011 has only one aperture.

The generated parallax image pair is temporarily stored in the memory 102.

Returning to FIG. 1, the parallax image pair obtained by one shooting operation and stored in the memory 102 is transmitted to the image-for-viewing generation unit 103, and the first signal and the second signal are added for each pixel to generate one image. That is, an image to be viewed (hereinafter referred to as "image for viewing") is generated with respect to the image formed by the light flux passing through the entire pupil area of the optical system 1011.

If the focus state is not detected or the distance image is not generated using the parallax images, the image for viewing may be generated by the arithmetic processing unit 204 integrated with the image sensor 1012 at the chip level, or by adding the first signal and the second signal in each pixel and then reading the signal. In the latter case, it is possible to contribute to saving the transmission band and shortening the time required for readout. In addition, if the image for viewing that is finally paired with the distance image is not required, the image-for-viewing generation unit 103 may not be explicitly present and may be included in the multi-viewpoint distance image generation unit 105.

The parallax image pair obtained by one shooting operation and stored in the memory 102 is transmitted to the single-viewpoint distance image generation unit 104. At that time, conversion to a luminance image may be performed. Then, pixels between the parallax images of the input parallax image pair are associated with each other, and a distance image is generated based on image shooting information including camera parameters such as the focal length and the aperture value which are defined based on the zoom state of the optical system 1011 and image sensor information such as the pixel pitch of the image sensor 1012. A distance image is generated based on the image pickup information. Hereinafter, the distance image generated by the single-viewpoint distance image generation unit 104 is referred to as a "single-viewpoint distance image".

The multi-viewpoint distance image generation unit 105 takes a plurality of images for viewing (images viewed from different viewpoints) as input, each obtained by converting each of a plurality of parallax image pairs obtained by performing a plurality of consecutive shooting of the same scene from different positions, that is, acquired by multi-shot, by the image-for-viewing generation unit 103, and generates a distance image. Hereinafter, the distance image generated by the multi-viewpoint distance image generation unit 105 is referred to as a "multi-viewpoint distance image". If a camera is an image capturing apparatus that moves, there is a parallax between the images for viewing obtained in chronological order by performing multi-shots. Therefore, if the movement and change in posture of the image capturing apparatus 100 are known, a multi-viewpoint distance image can be calculated from the parallax of the images for viewing (between different viewpoint images).

In the distance image integration unit 106, a single-viewpoint distance image and a multi-viewpoint distance image are integrated, and an integrated distance image is generated.

Next, the procedure of image shooting and integrated distance image generation in this embodiment will be described with reference to a flowchart of FIG. 3.

In step S101, shooting for single-viewpoint distance image generation (single shooting) and shooting for multi-viewpoint distance image generation (continuous shooting) are performed. The shooting order will be described later with reference to FIGS. 9A to 9C.

Figure 4:
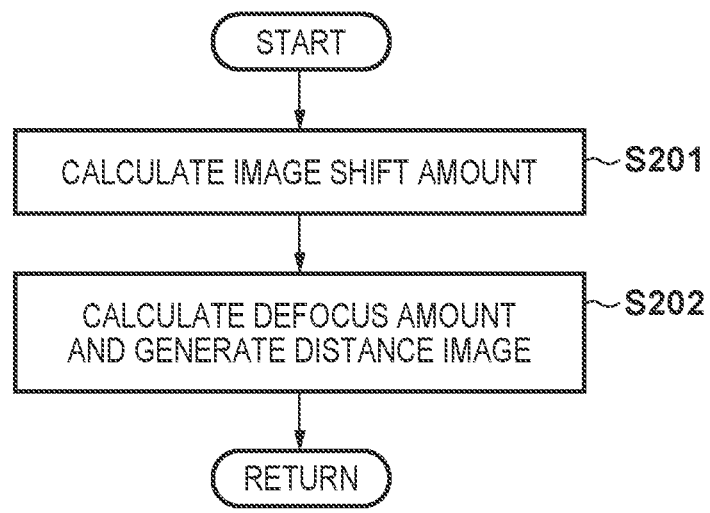
FIG. 4 is a flowchart of a single-viewpoint distance image generation processing according to the first embodiment.

In step S102, a parallax image pair obtained by single shooting is used for distance measurement processing and a single-viewpoint distance image is generated. FIG. 4 is a flowchart of the single-viewpoint distance image generation processing performed in step S102. In step S201 of FIG. 4, an image shift amount, which is the relative shift amount of positions between the parallax images, is calculated. A known method can be used to calculate the image shift amount. For example, a correlation value is calculated from signal data A (i) and B (i) of an image A and an image B using the following equation (1).

$$S(r) = \sum_{i=p}^{q} |A(i+r) - B(i)| \quad (1)$$

In the equation (1), S(r) is a correlation value indicating the degree of correlation between the two images with the image shift amount r, i is the pixel number, and r is the relative image shift amount of the two images. p and q indicate the target pixel range for calculating the correlation value S(r). The image shift amount can be obtained by finding the image shift amount r that minimizes the correlation value S(r).

The method for calculating the image shift amount is not limited to the above-mentioned method, and other known methods may be used.

Next, in step S202, the defocus amount is calculated from the image shift amount calculated in step S201. An optical image of the subject 10 is formed on the image sensor 1012 via the optical system 1011. The example shown in FIG. 2A described above shows a defocused state in which the luminous flux passing through the exit pupil 230 is focused on a focal plane 207. The defocus state indicates a state in which the focal plane 207 and an imaging surface (light receiving surface) of the image sensor 1012 do not coincide with each other and are displaced in the optical axis 202 direction, and the defocus amount is the distance between the imaging surface of the image sensor 1012 and the focal plane 207.

Here, an example of a conversion method of converting the defocus amount to a distance value will be described with reference to the simplified optical layout of the image capturing apparatus shown in FIG. 5.

Figure 5:
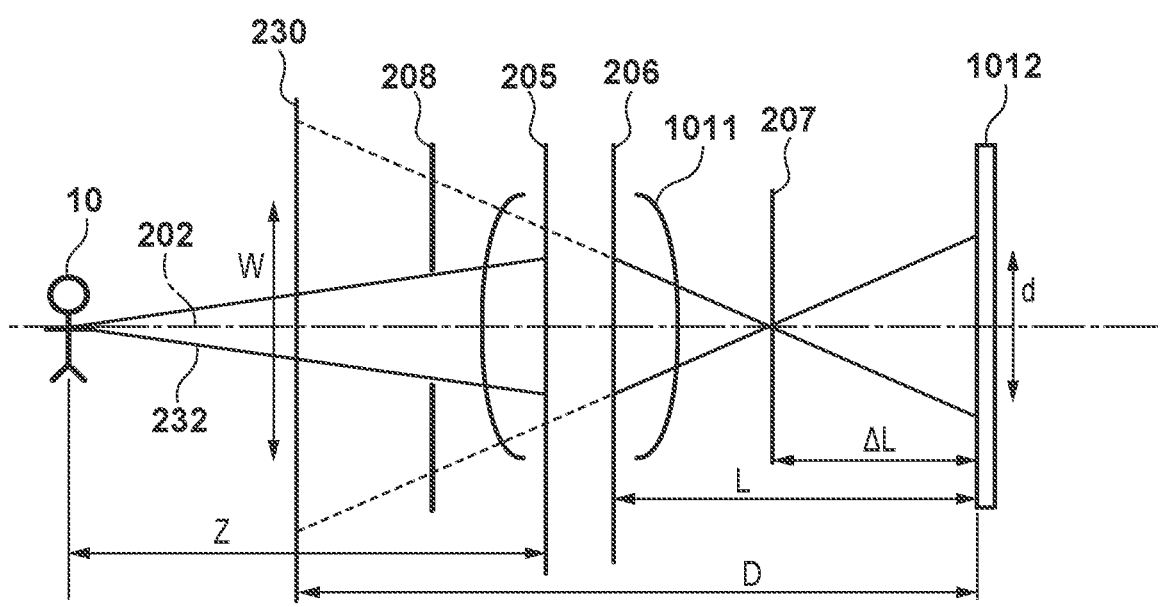
FIG. 5 is a diagram illustrating a method of converting a defocus amount into a distance value.

FIG. 5 shows a ray 232 in a state in which the image of a subject 10 is defocused with respect to the image sensor 1012, where a reference numeral 202 indicates an optical axis; 208, an aperture stop; 205, a front principal point; 206, a rear principal point; and 207, a focal plane. Further, d indicates an image shift amount, W indicates a baseline length, D indicates the distance between the image sensor 1012 and an exit pupil 230, Z indicates the distance between the front principal point 205 of the optical system 1011 and the subject 10, and L indicates the distance between an imaging surface of the image sensor 1012 and the rear principal point 206, and ΔL indicates a defocus amount.

In the image capturing apparatus of this embodiment, the distance to the subject 10 is detected based on the defocus amount ΔL. An image shift amount d indicating a relative positional deviation between the image A based on the first signals acquired from the photoelectric conversion portions 210a of each pixel 210 and the image B based on the second signals acquired from the photoelectric conversion portions 210b and the defocus amount ΔL have a relationship shown by the equation (2).

$$\Delta L = \frac{dL}{W - d} \quad (2)$$

The equation (2) can be simplified and written as the equation (3) by using a factor of proportionality K.

$$\Delta L \approx K \times d \quad (3)$$

The coefficient for converting the image shift amount into the defocus amount is referred to as "conversion coefficient", hereinafter. The conversion coefficient refers to, for example, the factor of proportionality K shown in the equation (3) or the baseline length W. In the description below, the correction of the baseline length W is equivalent to the correction of the conversion coefficient. The method for calculating the defocus amount is not limited to the method of the present embodiment, and other known methods may be used.

Further, the conversion from the defocus amount to the distance to a subject may be performed by using the following equation (4) showing the image formation relationship between the optical system 1011 and the image sensor 1012. Alternatively, the image shift amount may be directly converted into the distance to a subject using a conversion coefficient. In the equation (4), f is the focal length.

$$\frac{1}{Z} = \frac{1}{f} - \frac{1}{L - \Delta L} \quad (4)$$

A defocus map can be generated by obtaining the defocus amount for, for example, all the pixels between a plurality of input parallax images, for example, between the image A and the image B. By converting the defocus map using the relationship of the equation (4), the corresponding single-viewpoint distance image can be generated.

By the procedure of the distance calculation process as described above, in the pupil division imaging system, the single-viewpoint distance image can be calculated from a parallax image pair obtained in one shooting operation.

Returning to FIG. 3, in the next step S103, a multi-viewpoint distance image is generated from a plurality of images for viewing corresponding to the light passing through the entire pupil region and generated by the image-for-viewing generation unit 103 from the parallax image pair obtained in each shot of continuous shooting. It should be noted that it is assumed that the shooting is performed while the image capturing apparatus 100 is moved as being held by hand, for example, and the three-dimensional information of a scene is reconstructed from a plurality of images for viewing whose fields of view are overlapped, and a distance image of each shot is generated during the process.

The relative position and posture of the image capturing apparatus 100 between shots in continuous shooting can be acquired by an attitude sensor such as a gyro sensor, accelerometer, and tilt sensor, which are standardly attached to the image capturing apparatus 100 in recent years, and by a known camera posture estimation using camera shake detection, an image vector, and the like in an image stabilization function which is the standard function of the image capturing apparatus in recent years. Since the method for obtaining the position and posture is known, the description thereof is omitted here.

Figure 6A:
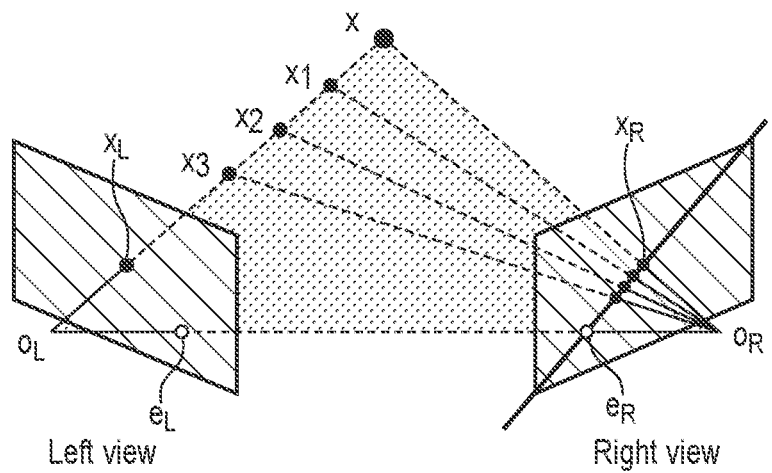
FIGS. 6A and 6B are diagrams illustrating a method of generating a multi-viewpoint distance image.
Figure 6B:
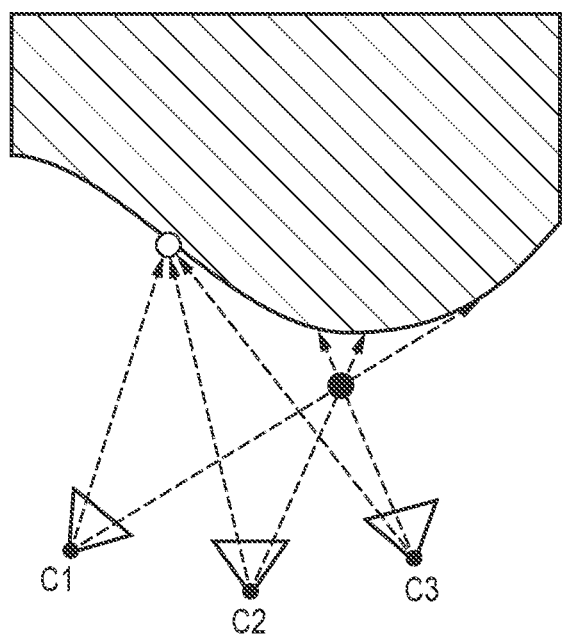

If changes in the position and posture of the image capturing apparatus 100 between shots in continuous shooting are known, the estimation of the distance to the subject captured in an image can be solved as a simple one-dimensional search question by considering epipolar geometric constraints as shown in FIG. 6A. In addition, if the point of the subject in the same space can be tracked between a plurality of images for viewing over a plurality of frames, this epipolar search can be performed as a multi-baseline search for finding the same distance between a plurality of different sets of images for viewing. By using this, it is possible to obtain the distance with high accuracy. For example, as shown in FIG. 6B, by increasing the number of shots by one, estimation of a distance image from a reference viewpoint C1 of the first shot can be performed not only between images shot at the viewpoint C1 and a viewpoint C2, but also between images shot at the viewpoint C1 and a viewpoint C3.

By increasing the number of related images in this way, it is possible to perform a plurality of searches for a depth value of each point in the image of the shot set as the reference image. This enables robust and highly accurate estimation of distance values. On the other hand, for a moving subject, epipolar geometry does not hold when taking correspondence between images which are shot successively, so the distance to the moving subject cannot be calculated in the multi-viewpoint distance image.

There are various known methods for taking correspondence between images which are shot successively. Examples of methods include a method of performing a patch-based mapping called PMVS, etc., and calculating the distance values in consideration of the normal direction ("Accurate, dense, and robust multiview stereopsis", IEEE Transactions Pattern Analysis and Machine Intelligence, 32 (8), pp.1362-1376 by Furukawa, Y. and Ponce, J. 2010.), and a method of setting a virtual depth plane called a plane sweep and making correspondence by inverse projection from each image, and so forth. The multi-viewpoint distance image generation is also called a multi-view stereo method or the like. By the method described above, it is possible to obtain a multi-viewpoint distance image corresponding to the image for viewing of the shot selected as the reference image out of a group of images for viewing which are aggregated images of the light from the entire pupil region and shot continuously.

In step S104, the single-viewpoint distance image and the multi-viewpoint distance image are integrated to generate an integrated distance image whose accuracy is high in whole range in the depth direction in the scene.

As described above, the single-viewpoint distance image includes the distance information of a stationary subject area and a moving subject area, but the multi-viewpoint distance image includes only the distance information of the stationary subject area. This is because the mapping of moving subject areas does not satisfy epipolar geometry when generating a multi-viewpoint distance image. Therefore, in the integration of the distance images in the present embodiment, the distance values of the moving subject area are acquired only from the single-viewpoint distance image, and the distance values of the stationary subject areas which overlaps between the single-viewpoint distance image and the multi-viewpoint distance image are acquired from the multi-viewpoint distance image, and the obtained distance values are integrated.

When the single-viewpoint distance image and the multi-viewpoint distance image are superimposed, the area where the distance information exists in both the single-viewpoint distance image and the multi-viewpoint distance image is the stationary subject area, and the area where the distance information exists only in the single-viewpoint distance image exists and the distance information does not exist or the reliability of the distance information, if obtained, is low in the multi-viewpoint distance image can be regarded as the moving subject area. Therefore, by acquiring the distance information of the stationary subject area from the multi-viewpoint distance image and the distance information of the moving subject area from the single-viewpoint distance image and integrating them, an integrated distance image with highly accurate distance information can be obtained.

FIGS. 7A-7D show an example of integrating a single-viewpoint distance image and a multi-viewpoint distance image. FIG. 7A is an image for viewing corresponding to a single-viewpoint distance image, FIG. 7B is a single-viewpoint distance image, FIG. 7C is a corresponding multi-viewpoint distance image, and FIG. 7D is an integrated distance image. In the single-viewpoint distance image in FIG. 7B, the distance information of an area of a person which is a moving subject exists, but in the multi-viewpoint distance image in FIG. 7C, the distance information of the area of the person which is a moving subject does not exist, so that the area is shown by white. Therefore, the distance information of the moving subject area is acquired from the single-viewpoint distance image in FIG. 7B, and the distance information of the overlapping stationary subject area is acquired from the multi-viewpoint distance image in FIG. 7C to generate the integrated distance image of FIG. 7D.

Further, as described above, as a characteristic unique to the pupil division imaging system, the distance to a subject existing at a short distance from the image capturing apparatus and outside of a predetermined distance range from an in-focus distance cannot be calculated accurately because the baseline length of the pupil division optical system is short. To solve this problem, an integrated distance image may be generated by obtaining, based on the distance information of the single-viewpoint distance image, the distance information of the moving subject area and a part of the stationary subject area which is at a short distance and is within the predetermined distance range from the in-focus distance from the single-viewpoint distance image, and obtaining the distance information of an area of the stationary subject area except the above area from the multi-viewpoint distance image.

Figure 8:
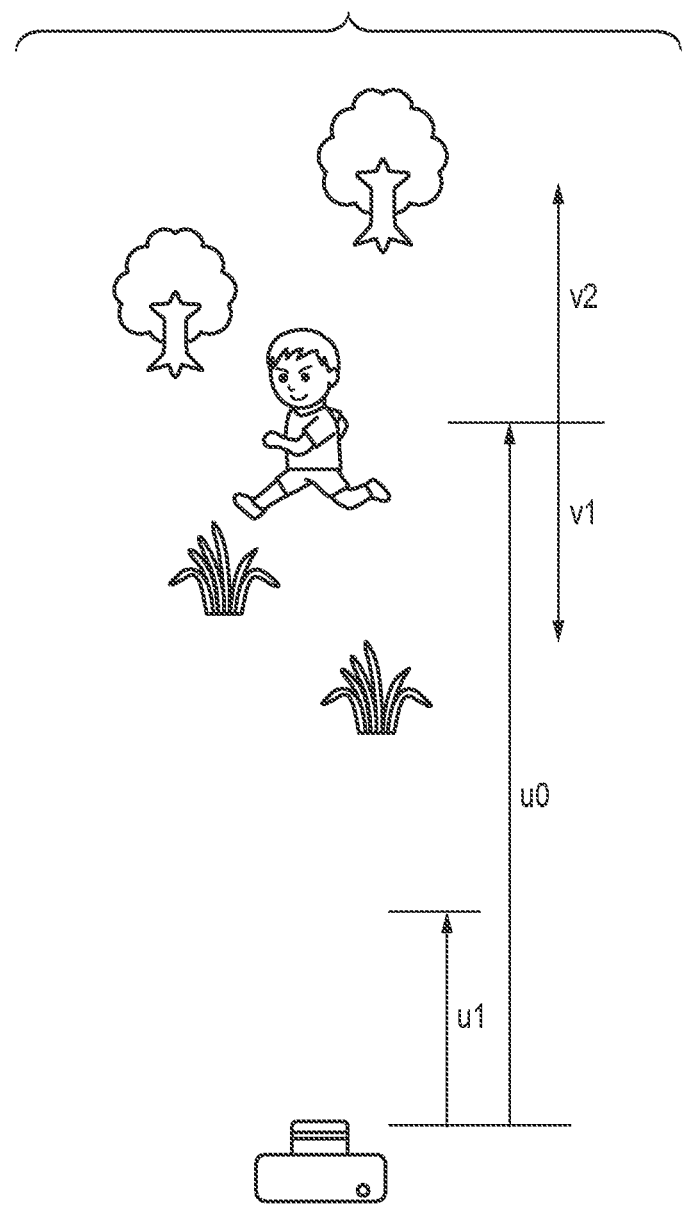
FIG. 8 is a diagram showing another example for combining a single-viewpoint distance image and a multi-viewpoint distance image according to the first embodiment.

FIG. 8 shows an example of determining from which of the single-viewpoint distance image and the multi-viewpoint distance image the distance values to be used in the integrated distance image are acquired based on the distance values of the single-viewpoint distance image. u0 indicates the in-focus distance, and v1 and v2 indicate the predetermined distance range from the in-focus distance u0, where v1 is on the front focused side, and v2 is on the rear focused side. Further, u1 is a distance (threshold value) indicating a vicinity range from the image capturing apparatus 100. If u is the distance value of each position in the distance image, the distance values (distance information) of a region satisfying at least one of the equations (5) and (6) are acquired from the single-viewpoint distance image.

$$u \leq u1 \tag{5}$$

$$-v1 \leq u-u0 \leq v2 \tag{6}$$

The distance values of other regions are acquired from the multi-viewpoint distance image. As a result, it is possible to acquire a distance image with higher accuracy in the entire range in the depth direction of the scene than a distance image whose distance values are acquired only from the single-viewpoint distance image.

In the multi-viewpoint distance image, there is no distance information for the moving subject area as an uncalculated area, whereas the distance information of the stationary subject area other than the moving subject area exists both in the multi-viewpoint distance image and the single-viewpoint distance image as the same overlapping area. However, the boundary between the moving subject area and the stationary subject area tends to be unclear. Therefore, to determine the boundary between the area that uses distance information obtained from the single-viewpoint distance image and the area that uses distance information obtained from the multi-viewpoint distance image, the moving subject area detection using the image for viewing as an input may be used in combination. For example, a face and body may be detected and the area thereof may be extracted, or a CNN network in which accuracy for extracting the moving subject area is improved by utilizing prior knowledge by learning or the like may be used.

The distance information (pixels) constituting the distance image is not necessarily limited to the distance to the subject (distance value), and may be an image shift amount or a defocus amount before converted to the distance to the subject. Further, the reciprocal of the distance to the subject (reciprocal distance value) may be used as the distance information (pixels) that constitute the distance image.

Further, in the single shooting and continuous shooting in step S101, the single shooting and continuous shooting may be performed in various ways. That is, the shooting for obtaining a single-viewpoint distance image may be performed as one shot of continuous shooting or as single shooting. Further, the continuous shooting may be performed before or after the single shooting, which is for obtaining a single-viewpoint distance image. In addition, if the moving amount of the image capturing apparatus 100 during continuous shooting is small and the baseline length is not enough, shooting may be performed later after a while.

FIGS. 9A to 9C show variations of shooting timings. FIG. 9A shows an example in which continuous shooting is first performed as pre-shooting to acquire a plurality of images, and then single shooting is performed to acquire a single-viewpoint distance image. In FIGS. 9A to 9C, SW1 represents a state in which the shutter button of the image capturing apparatus 100 is half-pressed, and SW2 represents a state in which the shutter button is fully pressed. Note that pre-shooting is a shooting method that utilizes a ring buffer, and is a general function that is installed as standard not only in apparatus dedicated to imaging such as cameras, but also in the camera functions of smartphones.

In this shooting method, images are temporarily stored in advance before the shutter button is fully pressed at SW2, and a user can select the true best shot at SW2 when the shutter button is fully pressed, or images obtained by repeatedly performing shooting for a certain period of time are stored for post-processing. This pre-shoot images are acquired as input for generating a multi-viewpoint distance image. At this time, since the pre-shot images are used only for generating a multi-viewpoint distance image, the signals of the photoelectric conversion portions 210a and 210b may be added for each pixel at the time of shooting so that the amount of image data may be reduced and saved as images for viewing. Further, images obtained at SW2 when the shutter button is fully pressed is saved as a parallax image pair and used to generate a single-viewpoint distance image, and they may be added for each pixel to generate an image for viewing and also used for generating a multi-viewpoint distance image. In that case, the multi-viewpoint distance image is generated with this image for viewing as a reference image.

FIG. 9B shows an example in which continuous shooting is performed after images for generating a single-viewpoint distance image are shot. In this shooting method, continuous shooting is performed for a certain period of time after the shutter button of the image capturing apparatus 100 is fully pressed at SW2 and shot images are saved. The best shot of a moving subject is taken at SW2 when the shutter button is fully pressed. Then, even after the shutter button is released, shooting is continued to obtain images for generating a multi-viewpoint distance image. Since the images obtained in the post-shooting after the shutter button is released are used only for generating a multi-viewpoint distance image, the signals of the photoelectric conversion portions 210a and 210b may be added for each pixel at the time of shooting and stored as images for viewing so as to save a storage capacity, as in the case of pre-shooting. However, the image obtained at SW2 when the shutter button is fully pressed is stored as a parallax image pair and used for generating a single-viewpoint distance image. In addition, the parallax image pair of this shot may also be added for each pixel and used to generate a multi-viewpoint distance image. In that case, the multi-viewpoint distance image is generated with this image being a reference image.

FIG. 9C shows a case where pre-shooting and post-shooting are performed before and after the shutter button is fully pressed at SW2. Images captured except when the shutter button is fully pressed at SW2 are acquired from the ring buffer. Since these images are used only for generating a multi-viewpoint distance image, the signals of the photoelectric conversion portions 210a and 210b may be added for each pixel at the time of shooting and stored as images for viewing to reduce the storage capacity. Further, the image captured at SW2 when the shutter button is fully pressed is saved as a parallax image pair and used to generate a single-viewpoint distance image, but the parallax images may be added for each pixel to generate an image for viewing and used to generate a multi-viewpoint distance image. In that case, the multi-viewpoint distance image is generated with this image being a reference image.

Figure 10A:
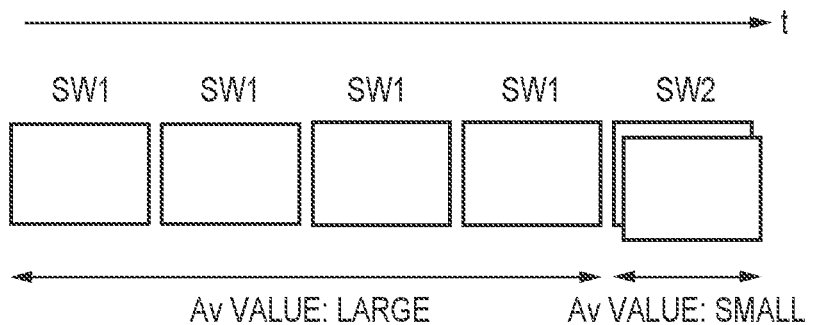
FIGS. 10A and 10B are diagrams illustrating an example of changing shooting conditions according to the first embodiment.

In addition, when a photographer intentionally selects the best shot for obtaining an image for viewing and a distance image as a set by operating the shutter button of the image capturing apparatus before generating the distance image, the imaging conditions may be explicitly changed between shooting for single-viewpoint distance image generation and shooting for multi-viewpoint distance image generation. For example, as shown in FIG. 10A, in continuous shooting for multi-viewpoint distance image generation, a large Av (aperture) value is set so that the aperture becomes small, and pan focus shooting is performed so that feature points can be easily extracted in the entire range in the depth direction of the scene. On the other hand, it is conceivable to use a small Av value only when the shutter button is fully pressed at SW2 so that the pupil is wide-opened and the distance measurement in single shooting can be performed accurately in the vicinity of the in-focus distance. The Tv value and ISO value are set appropriately according to the Ev table or the like following the Av value.

Figure 10B:
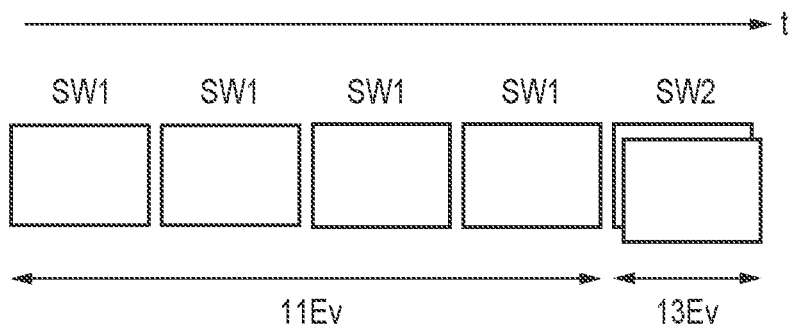

Furthermore, since only the distance value is actually integrated, it is not necessary to use the same Ev (exposure) value which is a total value of the Av value, the Tv value, and ISO value. Therefore, as shown in FIG. 10B, the Ev value which is the shooting conditions may be significantly changed between shooting for single-viewpoint distance image generation and shooting for multi-viewpoint distance image generation. FIG. 10B is an example in which different Ev values are used when shooting for single-viewpoint distance image generation is performed from when shooting for multi-viewpoint distance image generation is performed. For example, when such shooting conditions are used for shooting under a dark circumstance, it is possible to increase the situations in which the technique of the present invention can be used.

For example, if continuous shooting is desired to be performed with pan focus and motion blur is desired to be suppressed at the same time, the shooting conditions are set to have a low Ev value, for example, the total value of the Av value, Tv value, and ISO is 11 even if the amount of light becomes insufficient. On the other hand, in single shooting, the Ev value is increased by increasing the Av value, which is not equal to the Ev value used in continuous shooting, since if the Ev value same as that used in the continuous shooting is used in the single shooting, the less amount of light will increase noise. Even if the images are taken in this way, the captured images themselves are not integrated, so that problems are unlikely to occur. In a case where an image obtained by single shooting is used to generate a multi-viewpoint distance image, scaling correction of the gradation is applied to the pixel values of the image by the difference in Ev value so as to adjust the pixel values. In this case as well, the effect of the difference in Ev value is unlikely to occur because the difference in Ev value is only indirectly related to the integrated distance image, as a final result.

As described above, according to the first embodiment, the single-viewpoint distance image and the multi-viewpoint distance image are integrated so as to complement their respective shortcomings, it is possible to acquire the distance image of the entire scene including the moving subject with high accuracy.

Although the integrated distance information is expressed by a word "image", the output format of the information is not limited to an image. For example, the format may be a 2.5-dimensional stereoscopic image obtained by projecting a distance image into a three-dimensional space according to its distance values, a point cloud or volume data having a different storage format, or stereoscopic data converted into mesh information.

Second Embodiment

Figure 11:
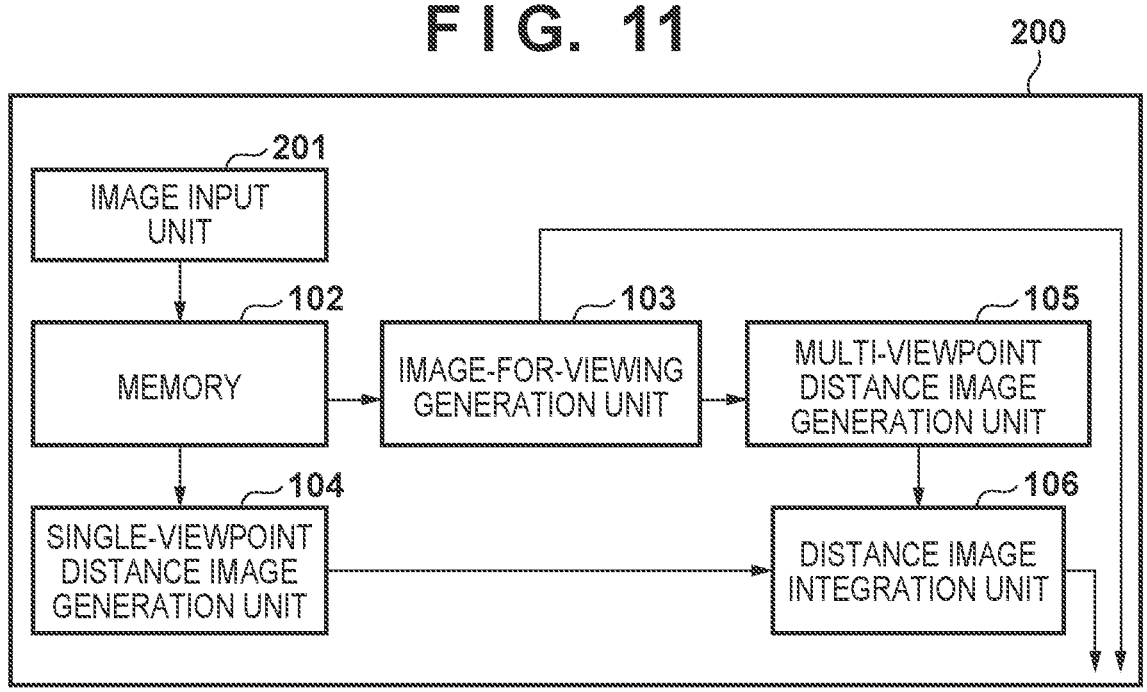
FIG. 11 is a block diagram showing a schematic configuration of an image processing apparatus according to a second embodiment.

Next, a second embodiment of the present invention will be described. FIG. 11 is a block diagram showing an image processing apparatus 200 according to the second embodiment.

An image input unit 201 receives a parallax image pair taken by an external image capturing apparatus (not shown) and an image for viewing if it is obtained by adding the parallax image pair for each pixel in the image capturing apparatus, and stores the input parallax image pair and the image for viewing in the memory 102. Then, the input parallax image pair and the image for viewing are processed as described in the first embodiment to obtain an integrated distance image. Since the configurations other than the image input unit 201 are the same as those shown in FIG. 1, the same reference numbers are assigned and the description thereof will be omitted here.

Figure 12A:
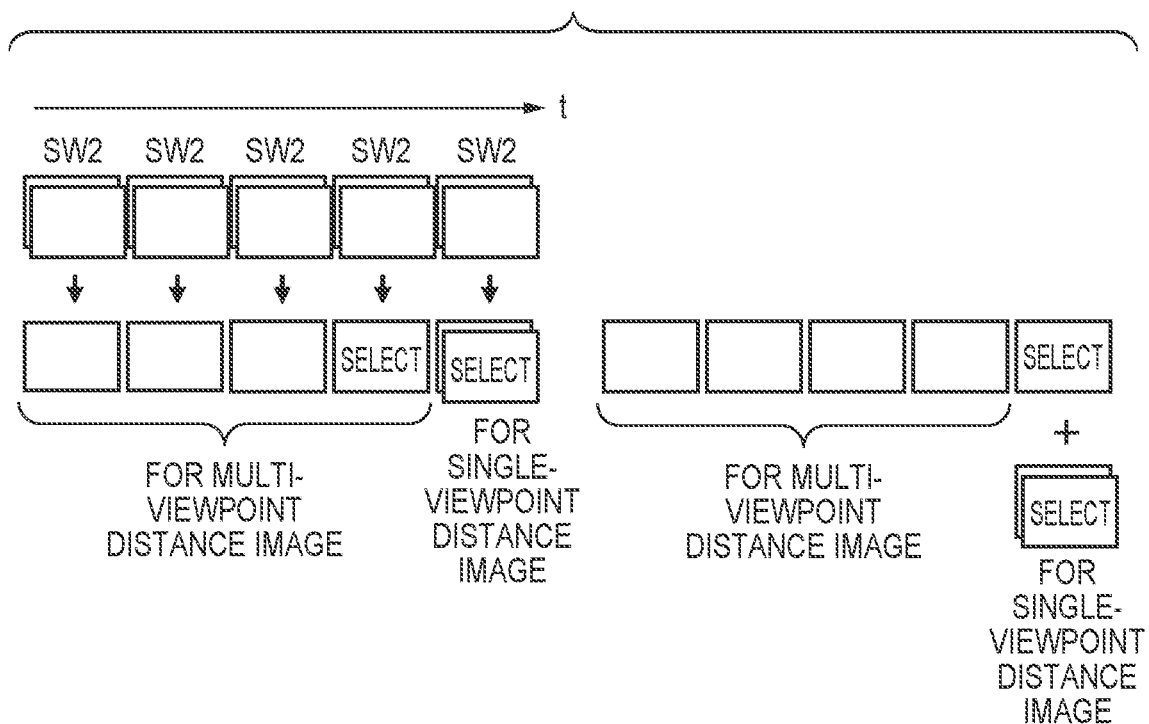

As shown in FIG. 12A, if a parallax image pair of every shot is input, it is possible to select a parallax image pair to be used for generating a single-viewpoint distance image and an image for viewing to be a reference image in generating a multi-viewpoint distance image. Therefore, from a plurality of parallax image pairs obtained by continuous shooting, a parallax image pair to be used for generating a single-viewpoint distance image and an image for viewing to be a reference image are selected using an algorithm determined before or after the shooting. For example, it may be set in advance so as to select the parallax image pair obtained at last of all shots. Since such a case is particularly assumed to be a case of moving image shooting, an image corresponding to each frame or an image captured every several frames is acquired as a parallax image pair during movie shooting.

Further, as shown in FIG. 12B, single-viewpoint distance images and multi-viewpoint distance images may be generated while sequentially shifting the parallax image pairs to be selected. By doing so, for every parallax image pairs, a highly accurate integrated distance image can be obtained even in a scene with a wide depth by integrating a single-viewpoint distance image and a multi-viewpoint distance image.

As described above, according to the second embodiment, in the image processing apparatus, a highly accurate distance image can be obtained by using parallax image pairs obtained from an image capturing apparatus.

Modification

In the description of the first and second embodiments described above, the shooting of a parallax image pair for generating a single-viewpoint distance image has been described as a typical single-shot shooting. However, if a subject moves slowly, a plurality of parallax image pairs may be shot, and the single-viewpoint distance image generation unit 104, may generate a single-viewpoint distance image from each of the parallax image pairs, and integrate the single-viewpoint distance images, thereby improving the quality of a single-viewpoint distance image, which may be further integrated with a multi-viewpoint distance image.

Figure 13:
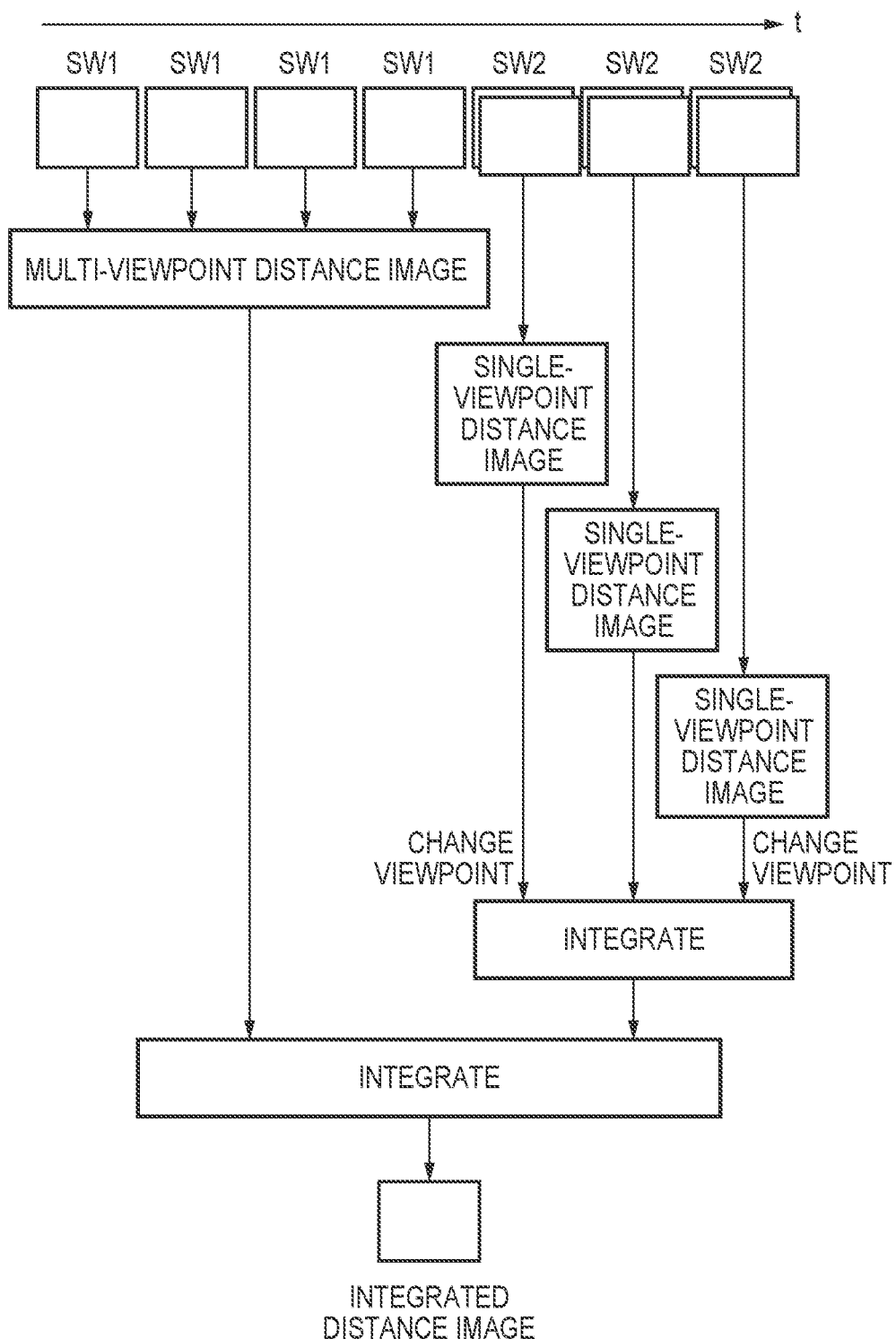
FIG. 13 is a diagram showing an outline of a procedure for generating an integrated distance image in a case of integrating a plurality of single-viewpoint distance images.

With reference to FIG. 13, a flow of generating and integrating single-viewpoint distance images from a plurality of parallax image pairs to improve the quality of a single-viewpoint distance image and then integrating it with a multi-viewpoint distance image will be described. For example, if there is a change in the position and/or posture of the image capturing apparatus between shots, viewpoints of single-viewpoint distance images are changed three-dimensionally so that coordinates of the single-viewpoint distance images coincide with the coordinates of a reference image, and then the single-viewpoint distance images are integrated.

For example, in FIG. 13, of the three parallax image pairs, the parallax image pair at the center is set as a reference, and the viewpoints of the single-viewpoint distance images obtained from the rest of the parallax image pairs are changed according to the shooting position and posture at the time of shooting the parallax image pair set as a reference. Then, the two single-viewpoint distance images whose viewpoints are converted and the reference single-viewpoint distance image are integrated, and the integrated single-viewpoint distance image is further integrated with the multi-viewpoint distance image to obtain the final integrated distance image.

According to the modification as described above, a more accurate distance image can be obtained.

Third Embodiment

Next, a third embodiment of the present invention will be described.

In the first embodiment and the second embodiment described above, it is explained that a single-viewpoint distance image generated from a parallax image pair obtained by single shooting by a pupil divided imaging system and a multi-viewpoint distance image generated from a plurality of images for viewing obtained by performing shooting a plurality of times in chronological order are integrated to generate an integrated distance image. However, in order to obtain a single-viewpoint distance image with high accuracy by using a parallax image pair shot by the pupil division imaging system as an input, it is necessary to widen the distance between the pupils and increase the baseline length. On the other hand, if the pupil is widened, then the depth of field becomes shallower, so that a subject existing outside the predetermined distance range from the in-focus position is blurred, and it becomes difficult to associate the subject in the images for viewing. Therefore, it becomes impossible to accurately calculate the distance to the subject existing outside the predetermined distance range from the in-focus position using the images for viewing.

As described above, in principle, there are restrictions on the shooting scenes and shooting conditions in which both the single-viewpoint distance image and the multi-viewpoint distance image with high accuracy can be obtained. For example, in an environment such as a dark place, the selectable shooting conditions become more severe, and it becomes more difficult to obtain both the single-viewpoint distance image and the multi-viewpoint distance image with high accuracy. This is because in a dark place, it is necessary to keep the shutter speed short to prevent motion blur, but because the amount of light is insufficient, it is necessary to open the pupil of the optical system and reduce the F value to increase the amount of light. As described above, when the pupil of the optical system is opened, the depth of field becomes shallow, the range in the depth direction in which a multi-viewpoint distance image can be accurately generated is narrowed.

Accordingly, in the third embodiment, shooting is performed so that parallax image pairs can be acquired even in the multi-shot shooting other than the main shooting in which a parallax image pair is acquired by the pupil division imaging system. Then, using the parallax image pair of each shot, an image for viewing whose depth of field is expanded is generated by recovering the defocus blur in the image area outside the predetermined distance range from the in-focus position, and an operation for finding corresponding points between a plurality of images for viewing obtained by the multi-shot shooting is performed found under no-defocus blur. Then, by integrating the single-viewpoint distance image and the multi-viewpoint distance image, a more accurate integrated distance image can be obtained in the entire scene including the distance to the subject outside the predetermined distance range from the in-focus position.

Figure 14:
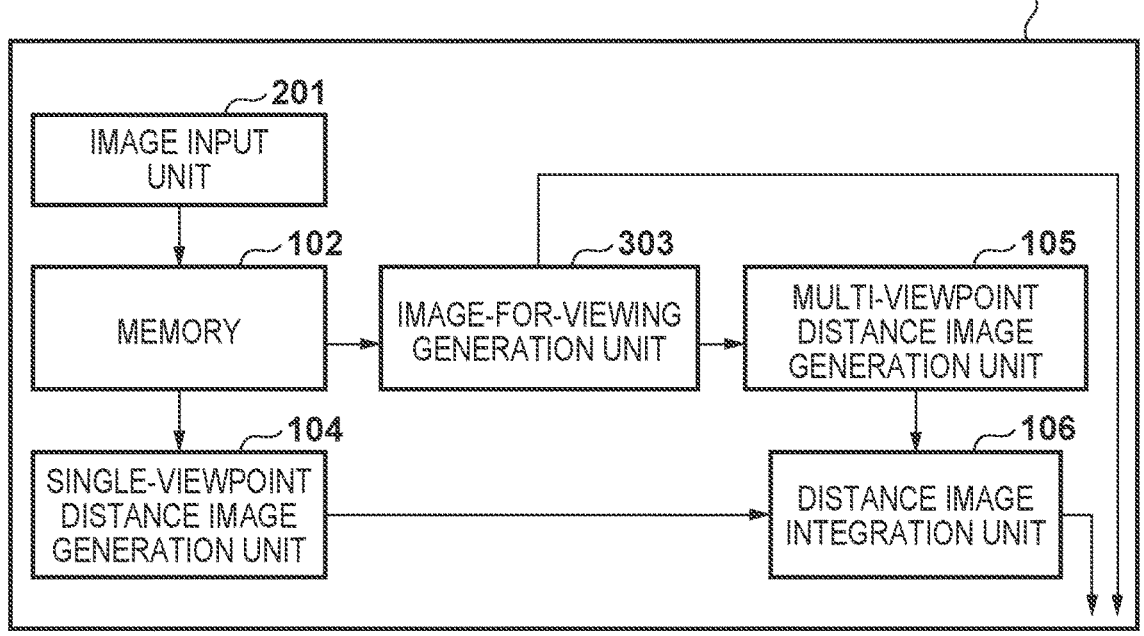
FIG. 14 is a block diagram showing a schematic configuration of an image processing apparatus according to a third embodiment.

FIG. 14 is a block diagram showing an image processing apparatus 300 according to the third embodiment. In FIG. 14, the same reference numeral is assigned to the same configuration as that of the image processing apparatus 200 described with reference to FIG. 11 in the second embodiment, and the description thereof will be omitted.

An image-for-viewing generation unit 303 in the third embodiment can generate an image for viewing from the input parallax image pair as is in the same manner as in the image-for-viewing generation unit 103, and can generate an image for viewing from the input parallax image pair after performing a defocus deblurring processing. That is, the defocus deblurring processing may be applied to all of the plurality of images for viewing input to the multi-viewpoint distance image generation unit 105, or may be applied to only a part of them. Therefore, all of the images input to the image-for-viewing generation unit 303 may be parallax image pairs, or both the parallax image pairs and the images for viewing in which the first signal and the second signal are added for each pixel and then output may be input to the image-for-viewing generation unit 303.

Figure 15:
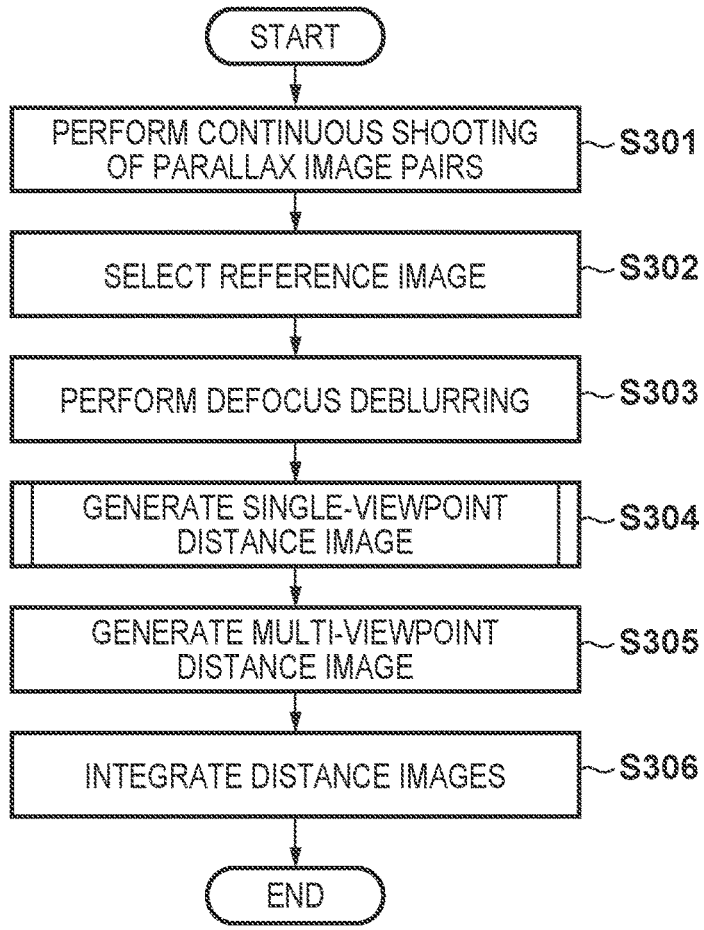
FIG. 15 is a flowchart showing a procedure of image shooting and integrated distance image generation according to the third embodiment.

Next, a procedure of shooting and integrated distance image generation in the third embodiment will be described with reference to a flowchart of FIG. 15.

In step S301, parallax image pairs to be used for generating single-viewpoint distance images and defocus deblurring are continuously shot a plurality of times (multi-shot). In a case of generating single-viewpoint distance images and performing defocus deblurring for all images obtained by performing multi-shots, all shots are performed to obtain a set of parallax images (parallax image pairs) consisting of a plurality of images, the number of images corresponding to the number of viewpoints under the microlens 211. If the single-viewpoint distance images are not generated and the defocus deblurring is not performed for some of the images obtained by performing the multi-shot, generated images for viewing may be input instead. In a case of acquiring a plurality of images by moving image shooting instead of multi-shot, the control to acquire parallax image pairs in all frames is simpler than the control not to acquire parallax image pairs in some of frames.

In step S302, an image to be referenced (i.e., reference image) for generating an integrated distance image is selected from a plurality of images obtained by performing multi-shot. In the case of continuous shooting of still images, a reference image may be selected in advance using a GUI of the image capturing apparatus at the time of shooting. Alternately, a reference image may be selected using a GUI (not shown) of the image processing apparatus 300. In a case of moving image shooting, a frame to be referenced for generating an integrated distance image is sequentially moved in the time direction.

In step S303, using a parallax image pair consisting of a plurality of images obtained in each shot or a part thereof, the number of images corresponding to the number of viewpoints under the microlens 211, single image for viewing to which defocus deblurring is applied is generated.

The defocus deblurring processing for the parallax image pair of each shot may be realized by a deconvolution process or a MAP estimation process that calculates a blind or distance image and estimates the defocus kernel. Alternatively, it may be realized by a deep learning process that substitutes for it. If the defocus deblurring processing on the parallax image pair of each shot is realized by using the deep learning process, the end-to-end processing using an encoder-decoder structure is considered first. Alternatively, it may be realized by constructing a network corresponding to deconvolution processing which includes estimating of the conventional non-blind distance image or the defocus kernel. Below, each process will be described.

Figure 16A:
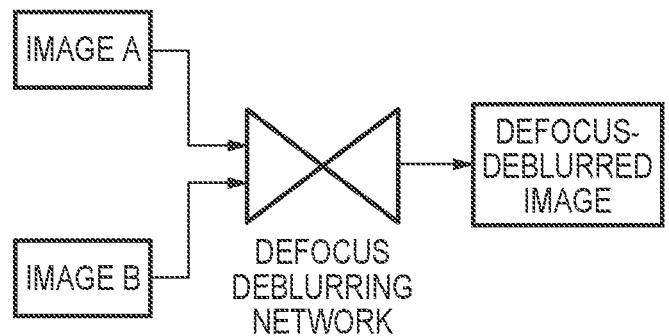
FIGS. 16A to 16C are diagrams showing an input/output relationship of a network used for defocus deblurring according to the third embodiment.
Figure 16B:
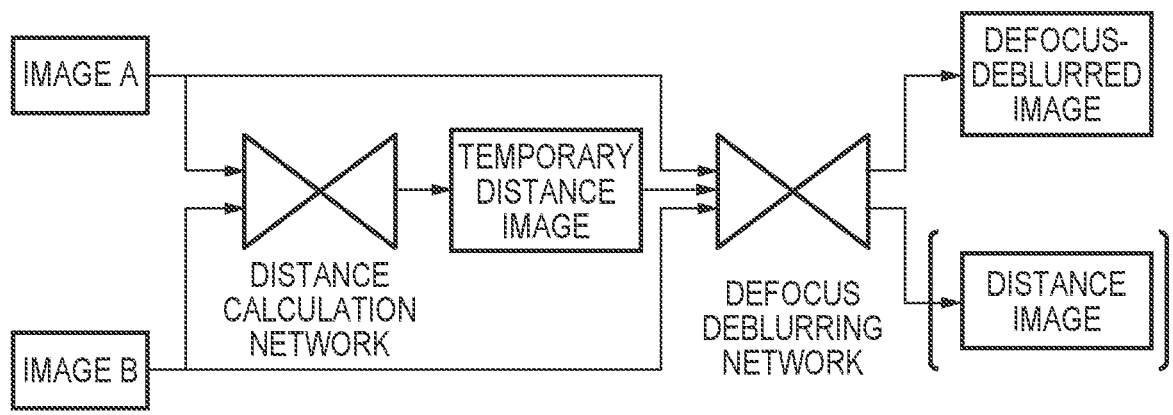
Figure 16C:
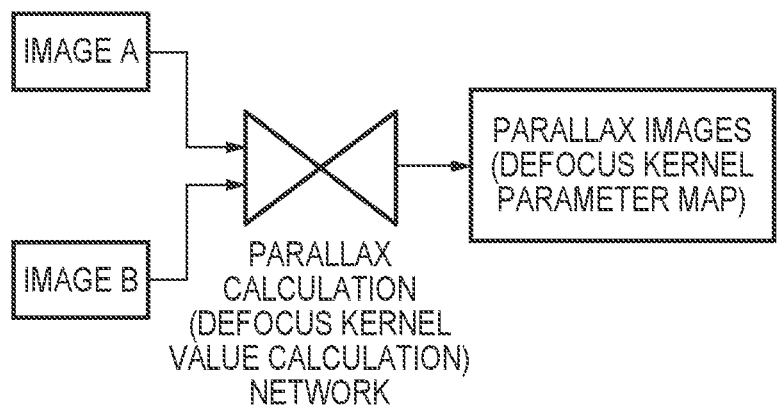

First, a method that uses the end-to-end processing using an encoder-decoder structure will be described. FIGS. 16A to 16C are diagrams showing the input-output relationship of a network used for the defocus deblurring processing. FIG. 16A is an input-output example of a network in which defocus deblurring is performed end-to-end. With regard to this approach, multiple network implementations have been proposed as in the form of "Defocus Deblurring Using Dual-Pixel Data", ECCV2020 by Abdullah Abuolaim and Michael S. Brown. It should be noted that any approach may be used as long as a parallax image pair (image A, image B) of each shot is input and a defocus-deblurred image can be obtained. The network is learned by using the omnifocal image taken by narrowing down the aperture of the image capturing apparatus as training data for the network of the encoder-decoder structure. The network is learned by using the difference between the output image and the ground truth omnifocal image as a loss. When the learning is completed, one image for viewing on which defocus deblurring has been performed is obtained with respect to each parallax image pair of each shot taken as input.

Next, an example of a method for constructing a network corresponding to deconvolution processing accompanied by estimating a distance image or a defocus kernel will be described. FIG. 16B shows an example of a network. The network is comprised of a network that inputs a parallax image pair of each shot and calculates a temporary distance image or a temporary reverse depth image which takes a reciprocal of a distance value d, namely, 1/d, and a network that inputs a parallax image pair and the temporary distance image or the temporary reverse depth image and outputs a defocus-deblurred image and a refined distance image or a refined reverse depth image. The temporary distance image or the temporary reverse depth image may be a parameter map representing the defocus kernel or an image thereof. Note that FIG. 16B illustrates a case where the number of the parallax images of each shot is two (image A and image B). The distance calculation network and the defocus deblurring network can be learned independently. The network is learned using a correct image of distance values corresponding to the parallax image pair and an omnifocal image shot by narrowing down the aperture of the image capturing apparatus as training data. This learning is performed by performing backpropagation using an error of a distance value, an error of a pixel value, an edge sharpness, and the like as an error function. An example of Such a network is disclosed in "Dual Pixel Exploration: Simultaneous Depth Estimation and Image Restoration", CVPR2021 by Conducted Liyuan Pan, Shah Chowdhury, Richard Hartley, Miaomiao Liu, Hongguang Zhang, Hongdong Li (referred to as "Pan et al." hereinafter). The details of the network, the details of learning data, the example of the error function, etc. can be realized by referring to Pan et al.

Although the distance calculation network and the defocus deblurring network are illustrated with reference to the forms of network of Pan et al., the present invention is not limited to the specific forms of network exemplified by Pan et al. The above networks may be replaced with other deep learning networks or classical methods. For example, a distance calculation network may be a deep learning network, as shown in FIG. 16C, that estimates model parameters of the defocus kernel as disclosed in "Modeling Defocus-Disparity in Dual-Pixel Sensors", ICCP2020 by Abhijith Punnappurath, Abdullah Abuolaim, Mahmoud Afifi and Michael S. Brown, (referred to as Punnappurath et al., hereinafter). Further, the defocus deblurring network may be replaced with the shift variant deconvolution processing which is the classical processing.

Punnappurath et al. discloses a network that estimates a model of the defocus kernel, creates a parallax map by finding parameters of defocus kernel for each angle of view with respect to an input parallax image pair of each shot, and outputs it as a substitute for a distance image.

Figure 3:
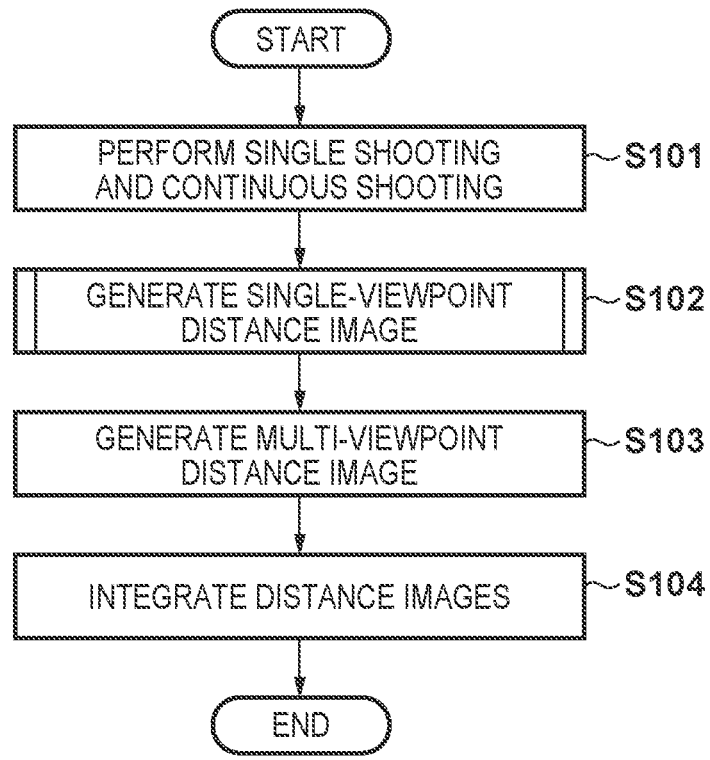
FIG. 3 is a flowchart showing a procedure of image shooting and integrated distance image generation according to the first embodiment.

In step S304, a single-viewpoint distance image is generated, and since this process is the same as the process in step S102 of FIG. 3 of the first embodiment, the description thereof will be omitted.

In S305, a multi-viewpoint distance image is generated by using a plurality of images for viewing acquired by multi-shot, including images for viewing undergone the defocus deblurring in step S303 and images for viewing not undergone the defocus deblurring. Since the method of generating the multi-viewpoint distance image is the same as the process in step S103 described in the first embodiment, the description thereof will be omitted.

In step S306, the single-viewpoint distance image and the multi-viewpoint distance image are integrated to generate an integrated distance image whose accuracy is high in whole range in the depth direction in the scene. Since the method of generating the integrated distance image is the same as the process in step S104 described in the first embodiment, the description thereof will be omitted.

Figure 17:
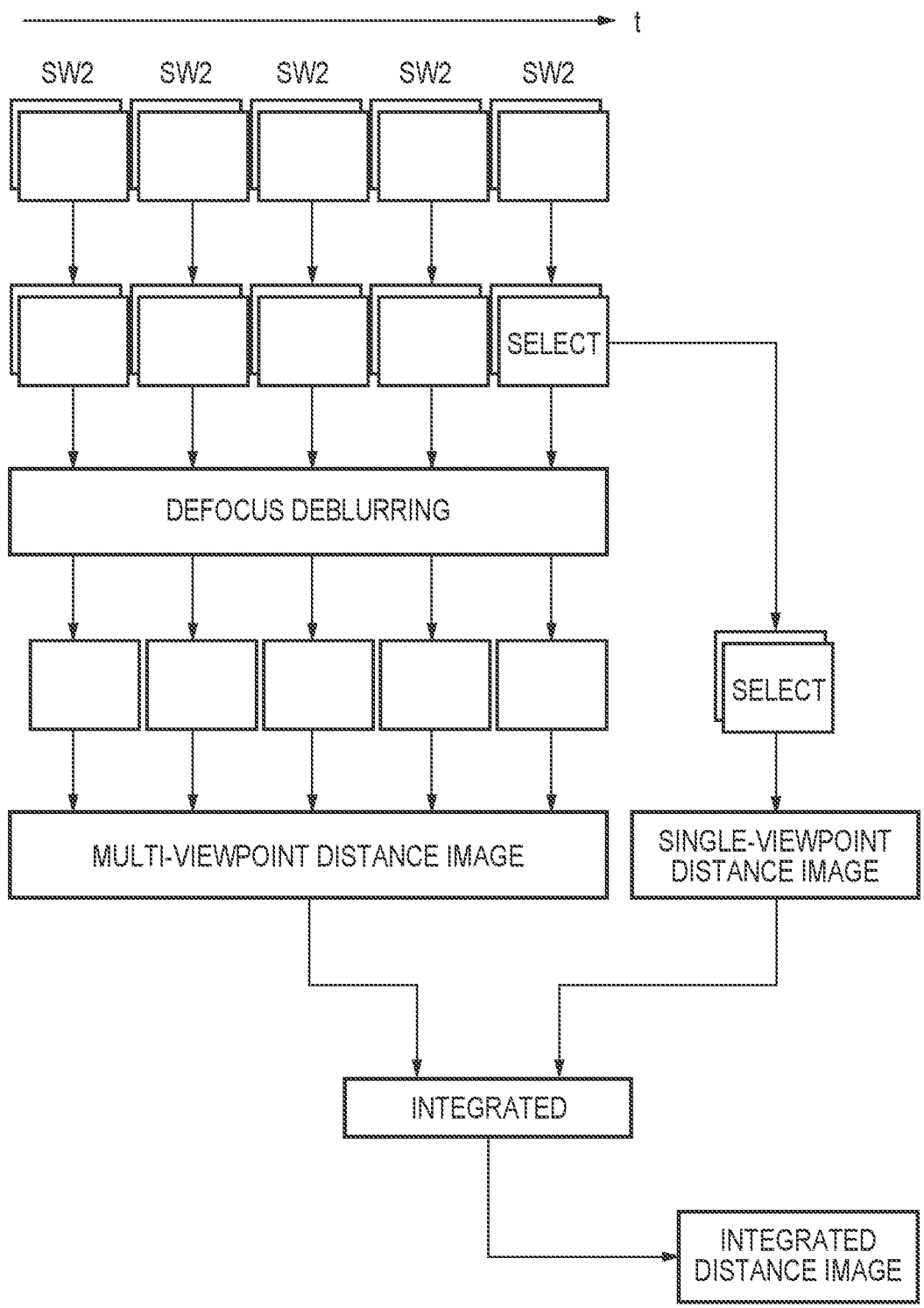
FIG. 17 is a diagram showing an outline of a procedure from shooting to integrated distance image generation according to the third embodiment.

Next, with reference to FIG. 17, the above-mentioned procedure from shooting to the generation of the integrated distance image will be outlined. Here, a case where all the images are acquired as parallax image pairs by multi-shot will be described. For example, assuming that a still camera is used for shooting, in step S301, the photographer may press the shutter button fully to perform shooting intentionally. After that, in step S302, a parallax image pair to be referenced (reference image pair) is selected from the plurality of parallax image pairs acquired by performing the multi-shot. The parallax image pair to be selected may be the same as the parallax image pair to be used for generating the single-viewpoint distance image. In step S303, the defocus deblurring processing is performed on the parallax image pairs to be used for generating images for viewing to be used for generating the multi-viewpoint distance image.

In step S304, a single-viewpoint distance image is generated using the selected parallax image pair. Then, in step S305, a multi-viewpoint distance image is generated from a plurality of images for viewing obtained by performing the defocus deblurring processing. In step S306, the single-viewpoint distance image and the multi-viewpoint distance image are integrated to obtain an integrated distance image. The obtained integrated distance image is a distance image having higher distance accuracy than the single-viewpoint distance image in the entire scene including the area outside the predetermined distance range from the in-focus point. Also, unlike the multi-viewpoint distance image, the distance value can be obtained even if a moving object is included.

Figure 18:
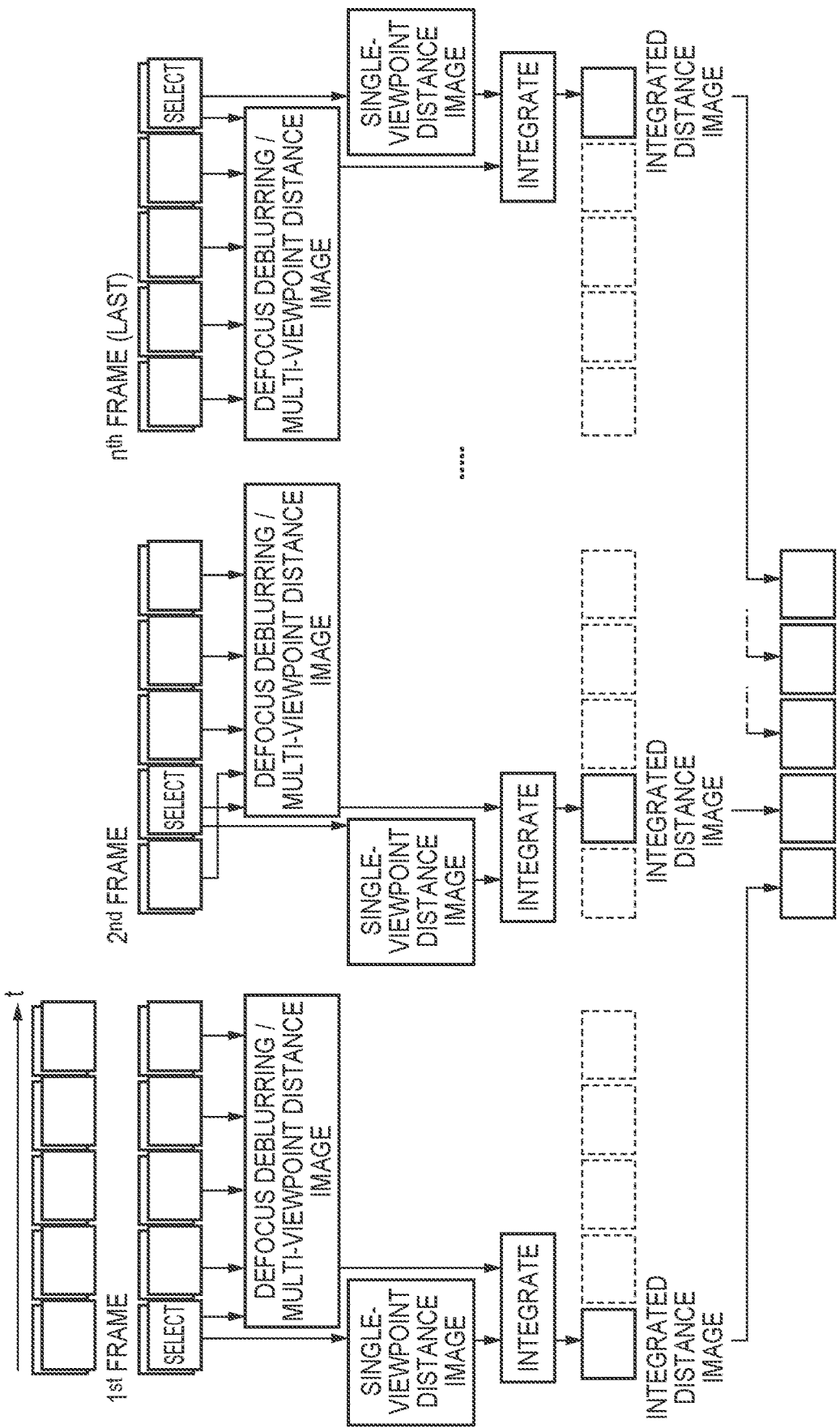
FIG. 18 is a diagram showing an outline of a procedure from acquisition of a plurality of frame images in moving image shooting to integrated distance image generation according to the third embodiment.

FIG. 18 is an explanatory diagram when it is desired to generate an integrated distance image for every image obtained by multi-shot, or when it is desired to generate an integrated distance image corresponding to every frame in moving image shooting. In this case, by sequentially shifting the selection of the reference image pair performed in step S302, the integrated distance images corresponding to all the shots are generated.

As described above, according to the third embodiment, it is possible to obtain a highly accurate distance image in various shooting scenes.

Fourth Embodiment

Next, a fourth embodiment of the present invention will be described.

Figure 19A:
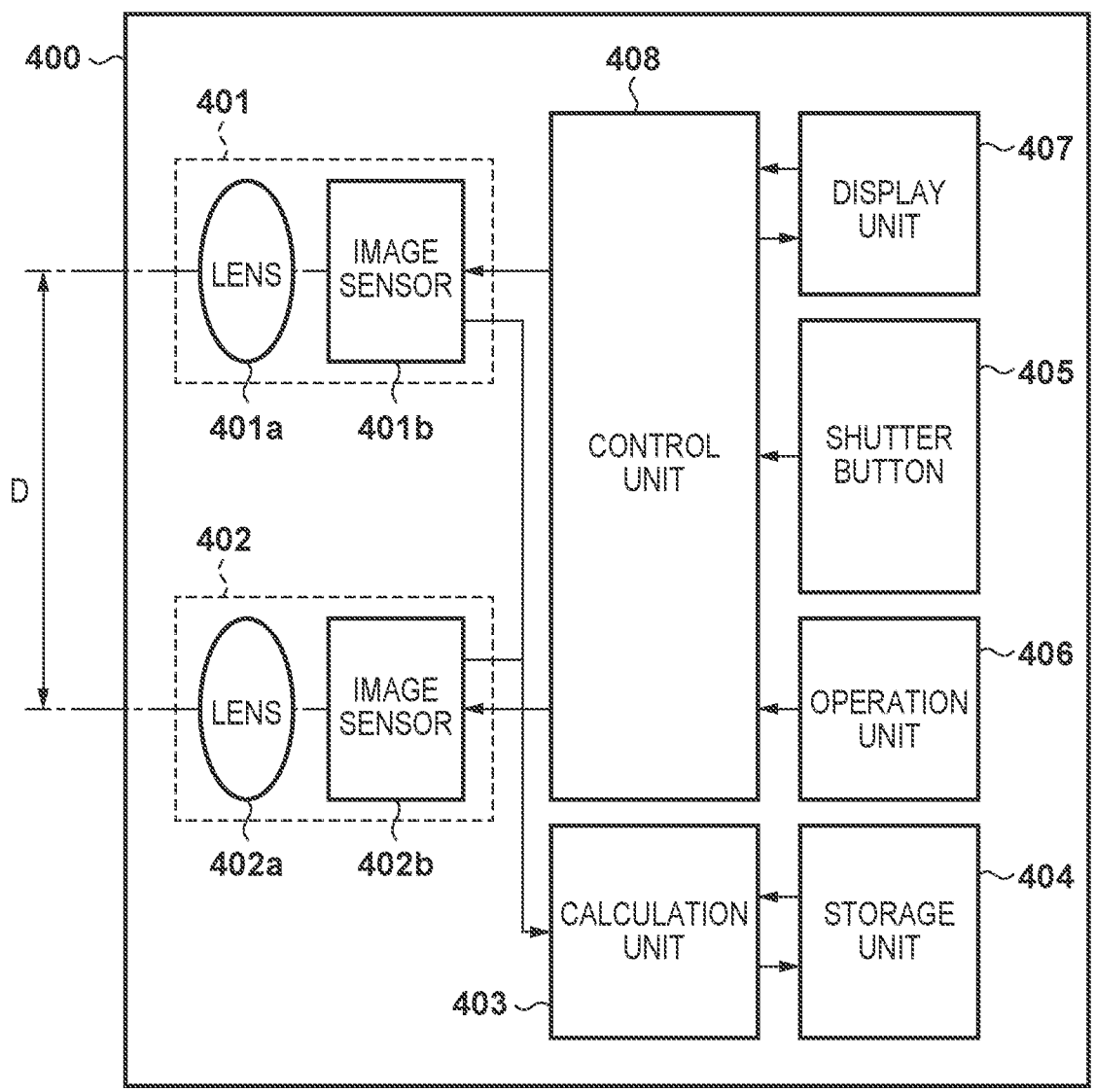
FIG. 19A is a block diagram showing a configuration of an image capturing apparatus according to a fourth embodiment.

FIG. 19A is a block diagram showing a configuration of an image capturing apparatus according to the fourth embodiment of the present invention. In FIG. 19A, the image capturing apparatus 400 includes an image sensing unit 401, an image sensing unit 402, a calculation unit 403, a storage unit 404, a shutter button 405, an operation unit 406, a display unit 407, and a control unit 408.

Figure 19B:
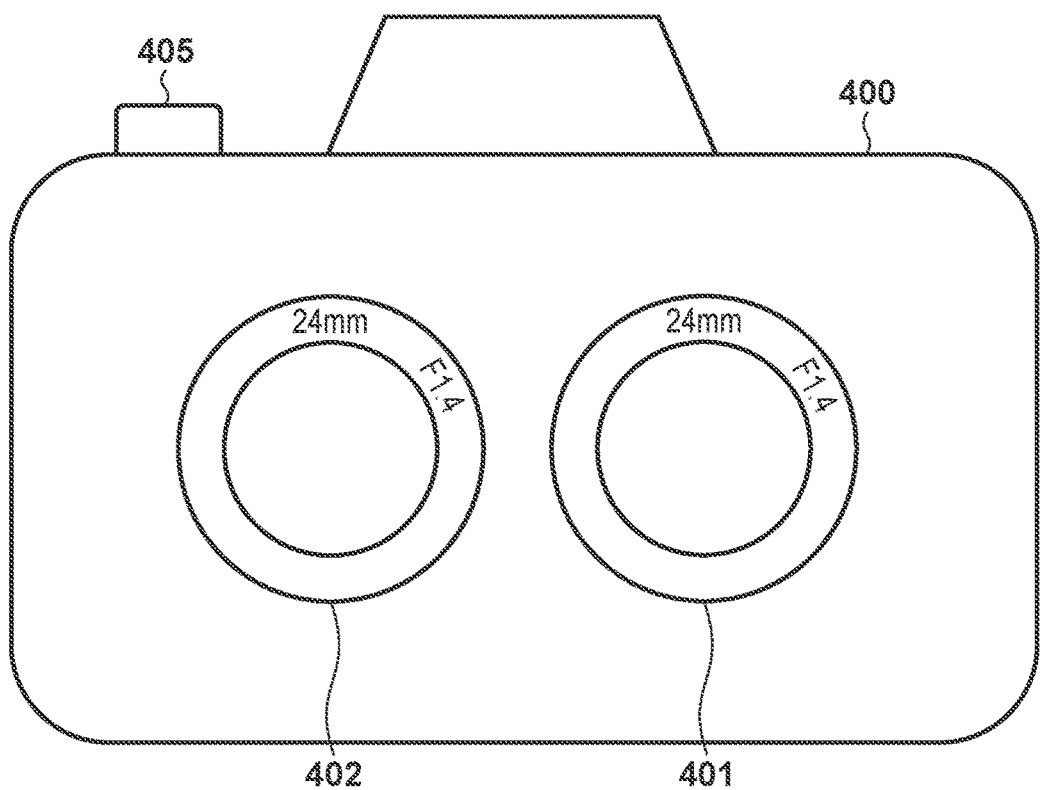
FIG. 19B is an external front view of the image capturing apparatus according to the fourth embodiment.

FIG. 19B is an external front view of the image capturing apparatus 400 of this embodiment. The image capturing apparatus 400 has two imaging units, i.e., the image sensing unit 401 and the image sensing unit 402. The image sensing unit 401 includes a lens 401a and an image sensor 401b. The image sensing unit 402 includes a lens 402a and an image sensor 402b. The lenses 401a and 402a converge the light reflected by the subject and form optical images on the image sensors 401b and 402b. The image sensors 401b and 402b convert the optical images into electric signals and output image data.

The image sensing unit 401 and the image sensing unit 402 are arranged so as to be capable of shooting a common subject and capturing images having parallax. When a user of the image capturing apparatus 400 presses the shutter button 405, the image sensing unit 401 and the image sensing unit 402 perform compound-eye stereoscopic photography. It is assumed that the distance D between the optical axis of the image sensing unit 401 and the optical axis of the image sensing unit 402 is known.

Figure 19C:
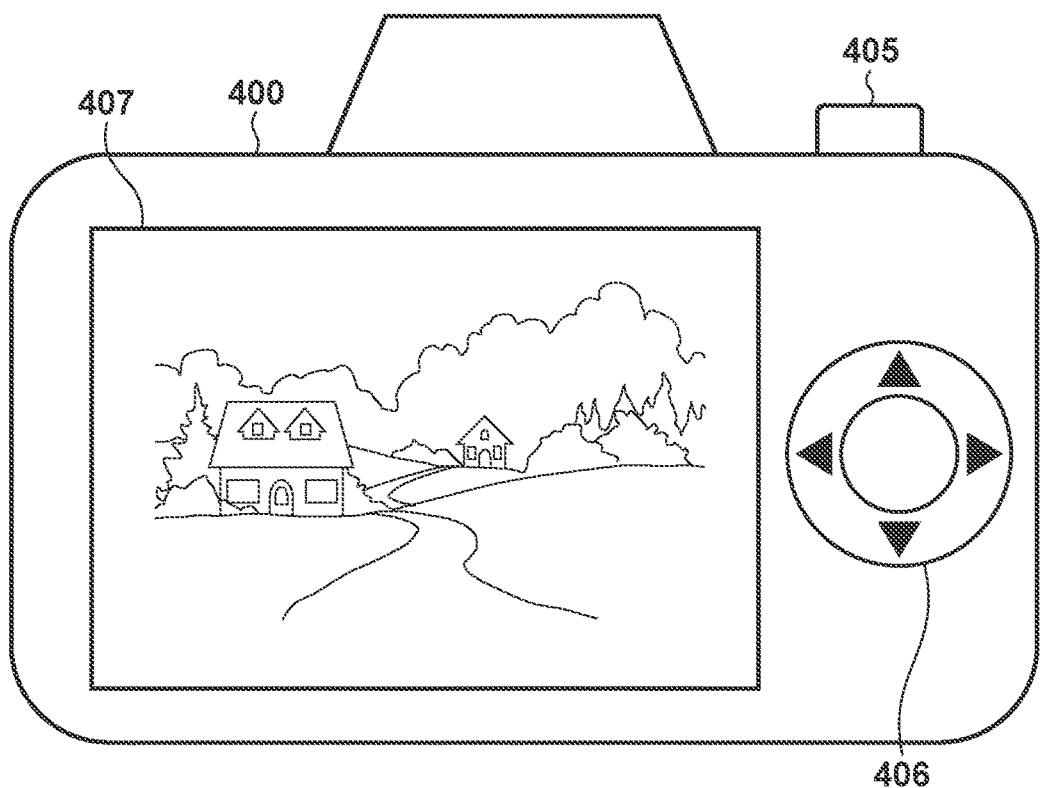
FIG. 19C is an external rear view of the image capturing apparatus according to the fourth embodiment.

FIG. 19C is an external rear view of the image capturing apparatus 400 of this embodiment. The operation unit 406 is pressed in order to set shooting conditions or give instructions such as starting or ending of the subject distance measurement mode. The display unit 407 is, for example, a liquid crystal display, which displays a composition at the time of shooting and displays various setting items. If the display unit 407 is a touch panel, it can be used as the shutter button 405 and operation unit 406, and the user can instruct to shoot an image and perform settings by touching the display unit 407. In this case, the image capturing apparatus 400 is not necessarily equipped with hardware parts such as the shutter button 405 and the operation unit 406, it is possible to facilitate operability, and it is possible to set a large display unit 407, which makes it easier to see.

The control unit 408 controls the shooting conditions in a case of shooting with the image sensing unit 401 and the image sensing unit 402. For example, the aperture diameter of a diaphragm of the optical system, the shutter speed, the ISO sensitivity, and the like are controlled. The calculation unit 403 develops the images shot by the image sensing unit 401 and the image sensing unit 402, and calculates the distance to a subject.

Figure 20:
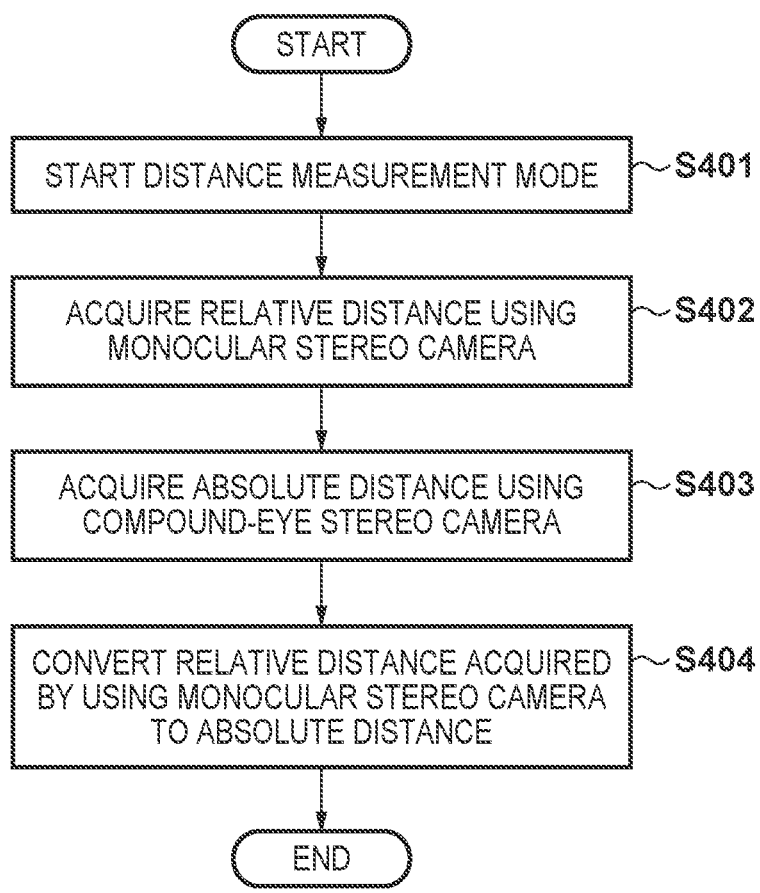
FIG. 20 is a flowchart showing an operation of distance measurement processing according to the fourth embodiment.

FIG. 20 is a flowchart showing an operation of distance measurement processing in the image capturing apparatus 400 of the present embodiment. When a user instructs the start of the distance measurement mode in step S401, the operation of this flowchart is started.

Figure 21A:
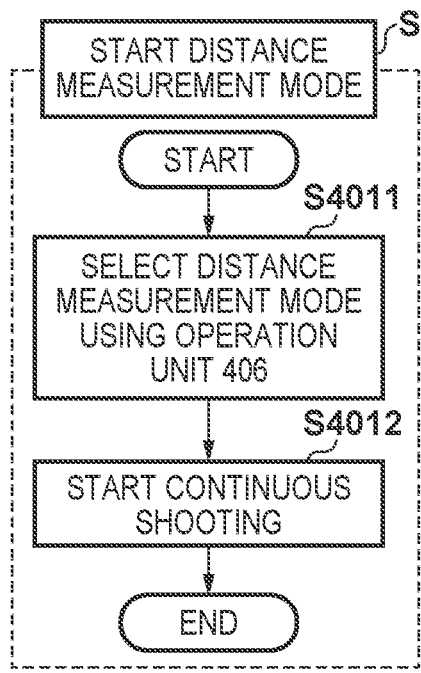
FIGS. 21A and 21B are flowcharts showing detailed processing of steps S401 and S402 of FIG. 20, respectively.

FIG. 21A is a flowchart showing detailed processing of step S401. Step S401 includes processes of step S4011 and step S4012.

Figure 22:
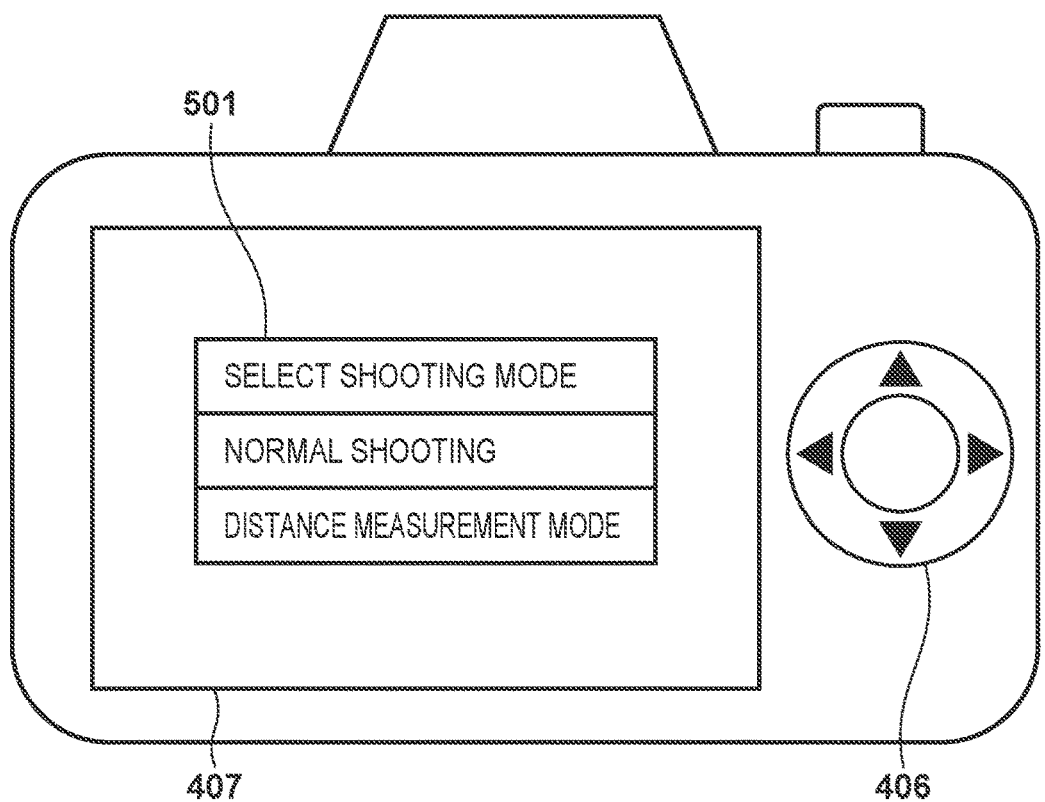
FIG. 22 is a diagram showing a mode selection screen of a display unit.

In step S4011, the user selects the distance measurement mode. FIG. 22 shows the state of the display unit 407 when the distance measurement mode is selected. The user operates the operation unit 406 to display a menu 501 on the display unit 407. The menu 501 shows items of shooting modes, and the user operates the operation unit 406 to select the distance measurement mode. In step S4012, the control unit 408 of the image capturing apparatus 400 starts continuous shooting.

Returning to FIG. 20, in step S402, the relative distance is acquired by a monocular stereo camera. In shooting with a monocular stereo camera, either the image sensing unit 401 or the image sensing unit 402 may be used. In this embodiment, it is assumed that the image sensing unit 401 is used for shooting. The continuous shooting may be performed with the frame intervals being short as in a moving image shooting, or may be performed with the frame intervals being long as in a continuous shooting of still images.

Figure 21B:
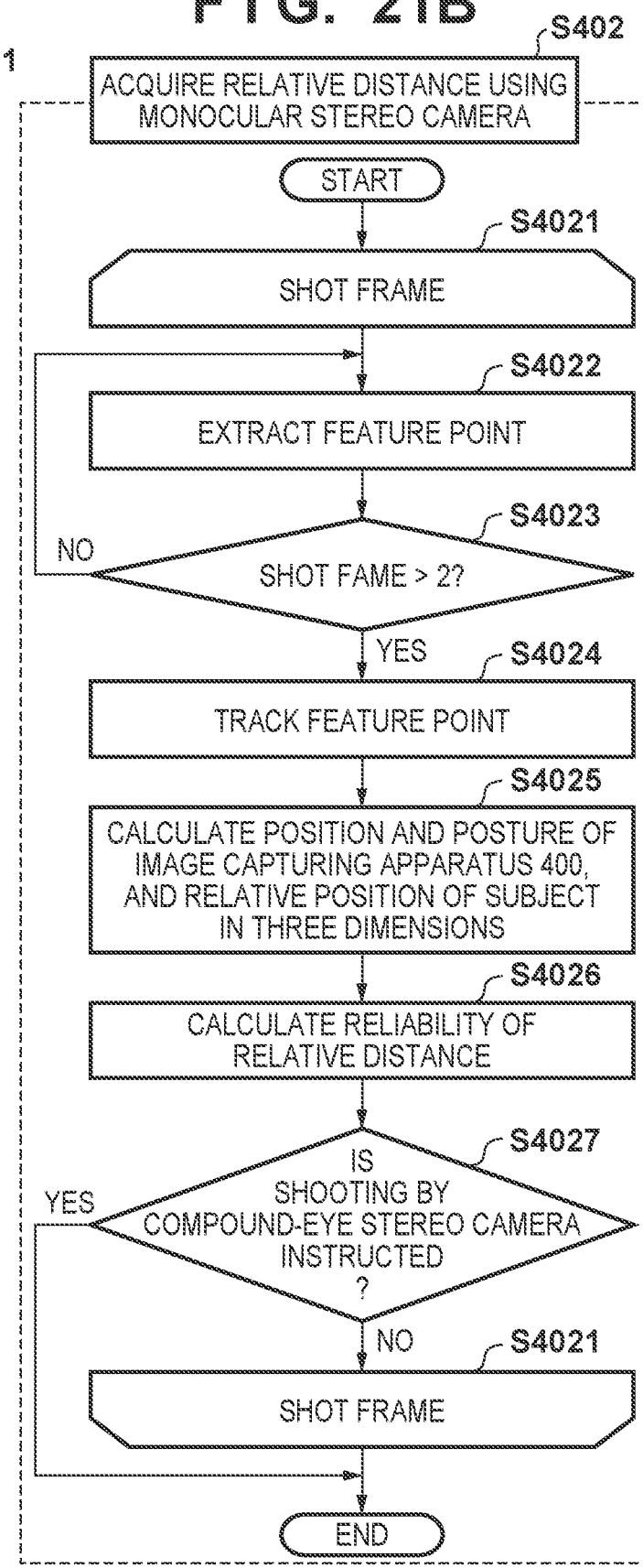

FIG. 21B is a flowchart showing the detailed processing of step S402. Step S402 includes the processes of steps S4021 to S4027.

Step S4021 indicates a loop of processing a shot frame by a monocular stereo camera. To acquire the relative distance using a monocular stereo camera, first, the three-dimensional relative position of a subject is acquired, and then converted into a relative distance value from a position from which the user wants to acquire an absolute distance value. A method such as SfM (Structure from Motion) or SLAM (Simultaneous Localization And Mapping) may be used to acquire the three-dimensional relative position of a subject. Alternatively, a method called MVS (Multi View Stereo), in which the position and posture of the image capturing apparatus 400 is calculated by SfM or SLAM and then the position and posture are used to acquire dense three-dimensional relative positions, may also be used. In the following explanation, it is assumed that a method of simultaneously acquiring the position and posture of the image capturing apparatus 400 and the three-dimensional relative position of a subject, such as SfM and SLAM, is used.

Figure 23:
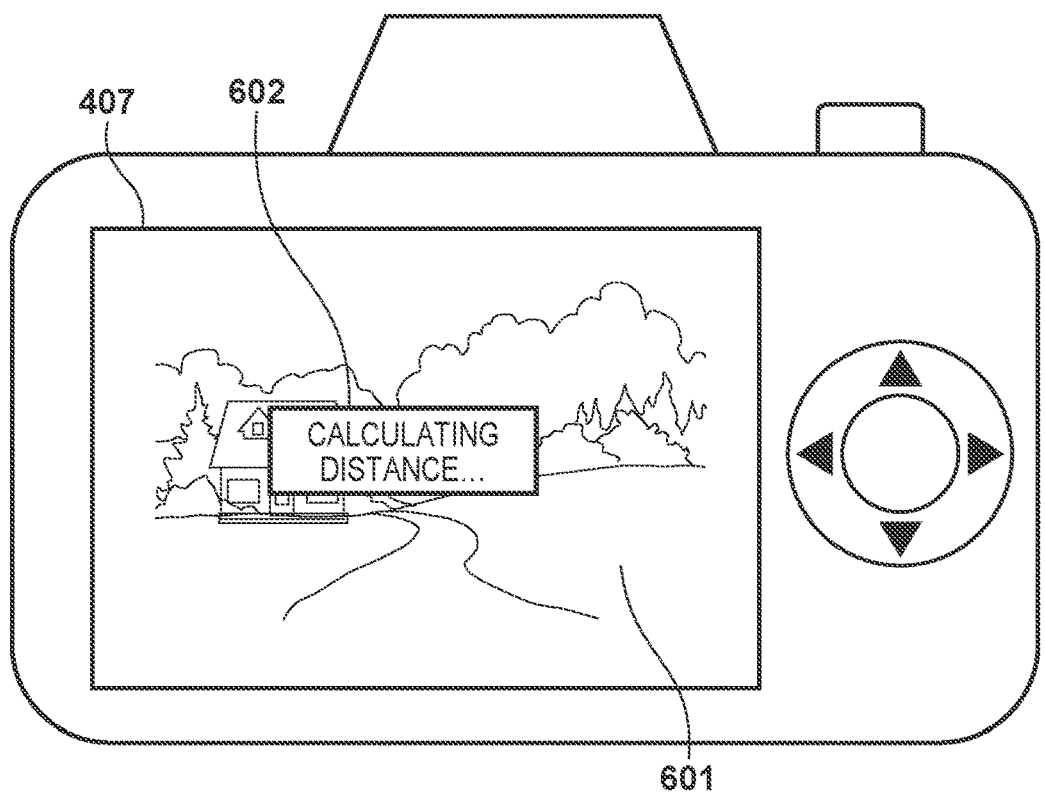
FIG. 23 is a diagram showing a screen of the display unit during distance measurement is in progress.

FIG. 23 is a diagram showing the state of the display unit 407 during measurement of the relative distance. An image 601 displays a subject to which a relative distance is to be measured in real time. By shooting an image while watching this image, the user can perform the relative distance measurement including the subject to which distance the user wishes to measure. A notification 602 is for notifying the user that the relative distance measurement is being performed by monocular stereo image shooting, and is superimposed on the image 601. The notification 602 can also be performed by an alarm sound, a voice guide, or the like, and in that case, the image 601 can be displayed without any hidden portion.

In step S4022, the control unit 408 extracts a feature point from the image of the current shooting frame. Typical methods for extracting a feature point include SIFT (Scale Invariant Feature Transform), SURF (Speeded-Up Roust Features), and FAST (Features from Accelerated Segment Test), however, other methods may be used.

In step S4023, the control unit 408 determines whether or not the current frame is the first frame, and if it is the first frame, the process proceeds to the second frame without performing subsequent processes, and if not, the process proceeds to step S4024.

In step S4024, the control unit 408 associates the feature point extracted in step S4022 in the immediately preceding frame with the feature point extracted in step S4022 in the current frame. If the frame intervals are long, it is necessary that sufficient amount of the common part of the subject to which distance is to be measured is included in the images of different frames. This is because if the amount of the common part is small, the feature point may not be associated between images and the calculation of relative distance acquisition may stop.

Figure 24:
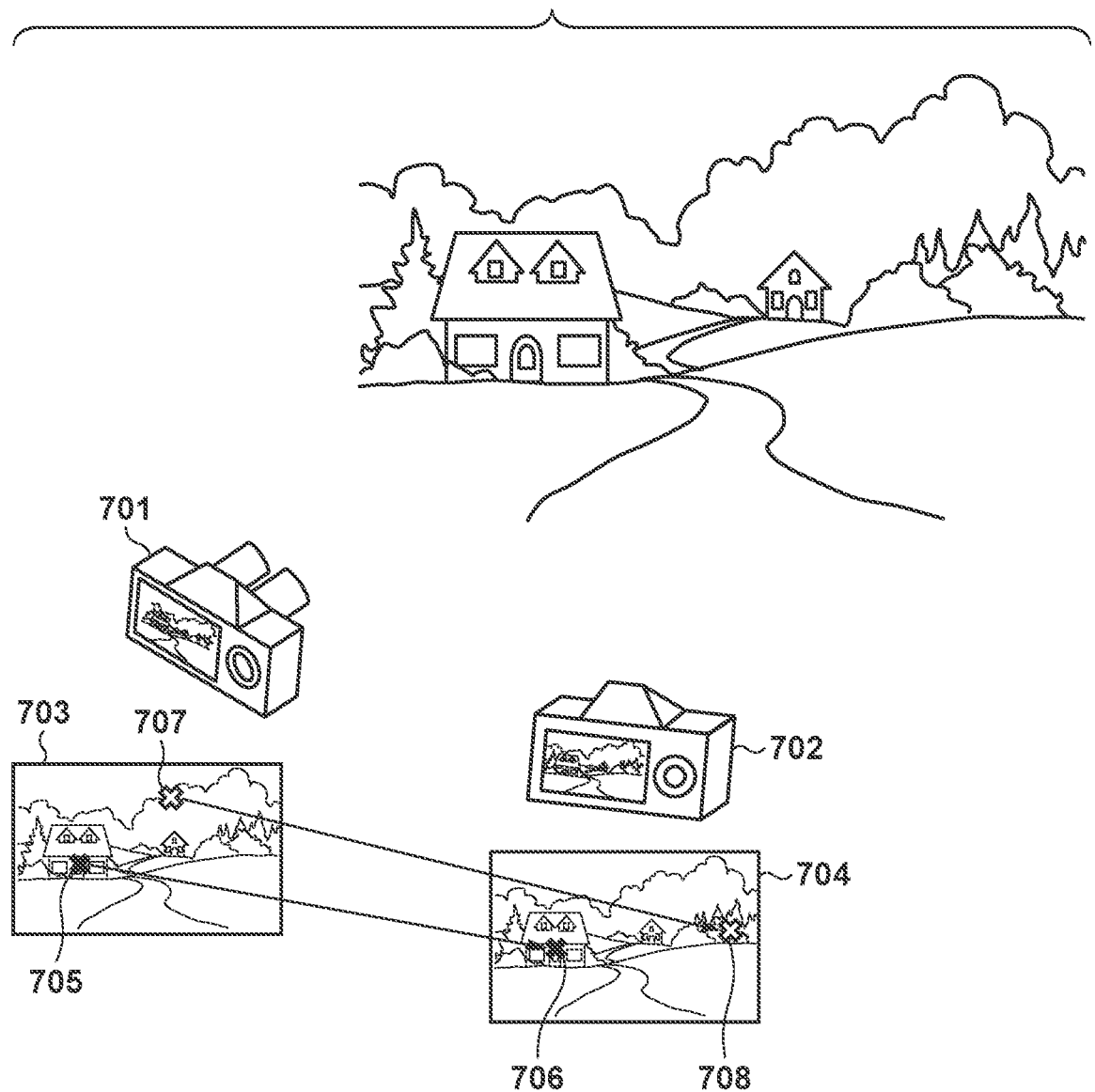
FIG. 24 is a diagram showing a state of feature point tracking by a monocular stereo camera.

FIG. 24 is a diagram showing how feature points are associated during relative distance measurement by a monocular stereo camera. Positions 701 and 702 indicate the positions of the image capturing apparatus 400 at different times. An image 703 and an image 704 show images taken by the image sensing unit 401 at the positions 701 and 702, respectively. A feature point 705 is a feature point extracted from the image 703, and is correctly associated with a feature point 706 in the image 704. On the other hand, a point corresponding to a feature point 707 is not properly extracted from the image 704, and the feature point 707 is erroneously associated with a feature point 708 in the image 704.

Now, if the reliability of a relative distance value by the monocular stereo camera is defined as the matching accuracy of feature points, the feature point 707 has poor matching accuracy, and the reliability of the relative distance value is relatively low. The causes of such a decrease in reliability include a small amount of texture of the subject and an image at a position in the image 704 corresponding to the feature point 707 being blurred.

In step S4025, the control unit 408 calculates the position and posture of the image capturing apparatus 400 and the three-dimensional relative position of a subject.

In step S4026, the control unit 408 calculates the reliability of the relative distance value. The matching accuracy of the feature point associated between images in step S4024 is calculated, and it is assumed that the higher the matching accuracy, the higher the reliability. An algorithm such as RANSAC (Random Sample Consensus) may be used to calculate the matching accuracy. RANSAC calculates how much the movement of the feature point of interest deviates based on the position and orientation of the image capturing apparatus 400 and the average value of the movement of many feature points in the images, and determines the matching accuracy of each of the feature points.

In step S4027, the control unit 408 determines whether or not the user has instructed shooting by a compound-eye stereo camera. If the user has not instructed, the process continues to the next frame, and if the user has instructed, the processing of this flow is terminated and the process proceeds to step S403 in FIG. 20. Here, the instruction for shooting by a compound-eye stereo camera is an instruction issued by the user by pressing the shutter button 405 halfway to start the shooting operation for calculating the absolute distance value.

In step S403, the control unit 408 performs shooting by a compound eye stereo camera, namely, by using both the image sensing unit 401 and the image sensing unit 402, and obtains an absolute distance value.

Figure 25:
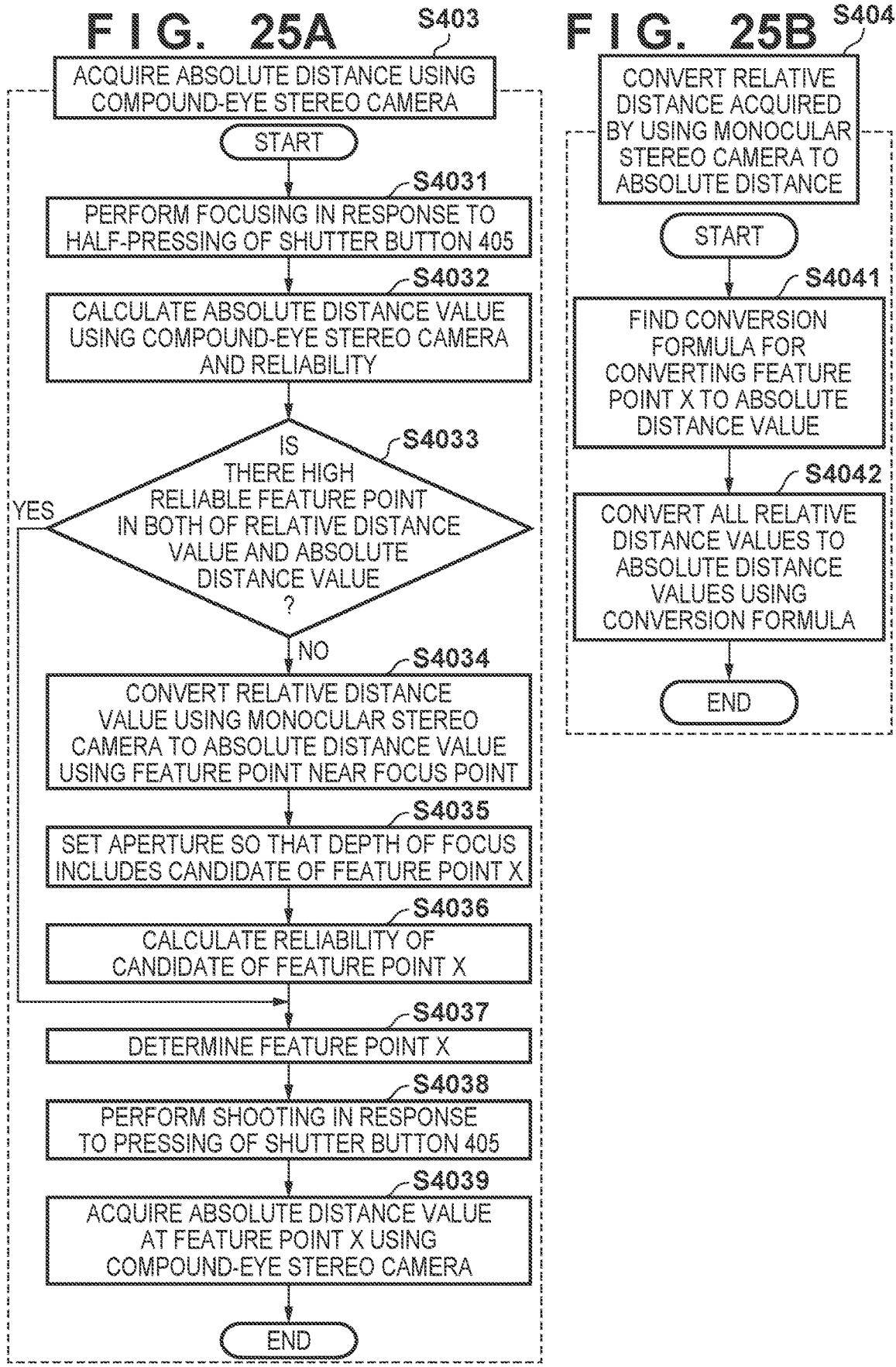
FIGS. 25A and 25B are flowcharts showing detailed processing of steps S403 and S404 of FIG. 20, respectively.

FIG. 25A is a flowchart showing detailed processing of step S403. Step S403 includes the processes of steps S4031 to S4039.

In step S4031, the control unit 408 focuses on a specific subject. The specific subject is, for example, a subject to which a user particularly wants to measure a distance. As a focusing method, for example, there is a method of focusing by the autofocus function performed in response to half-pressing of the shutter button 405 by the user. Or manual focusing may be performed. Here, both the image sensing unit 401 and the image sensing unit 402 focus on the same subject.

In step S4032, the absolute distance by the compound-eye stereo camera and its reliability are calculated. In the absolute distance calculation using the compound-eye stereo camera, a technique such as stereo matching is used for the images taken by the image sensing unit 401 and the image sensing unit 402, respectively.

Figure 26:
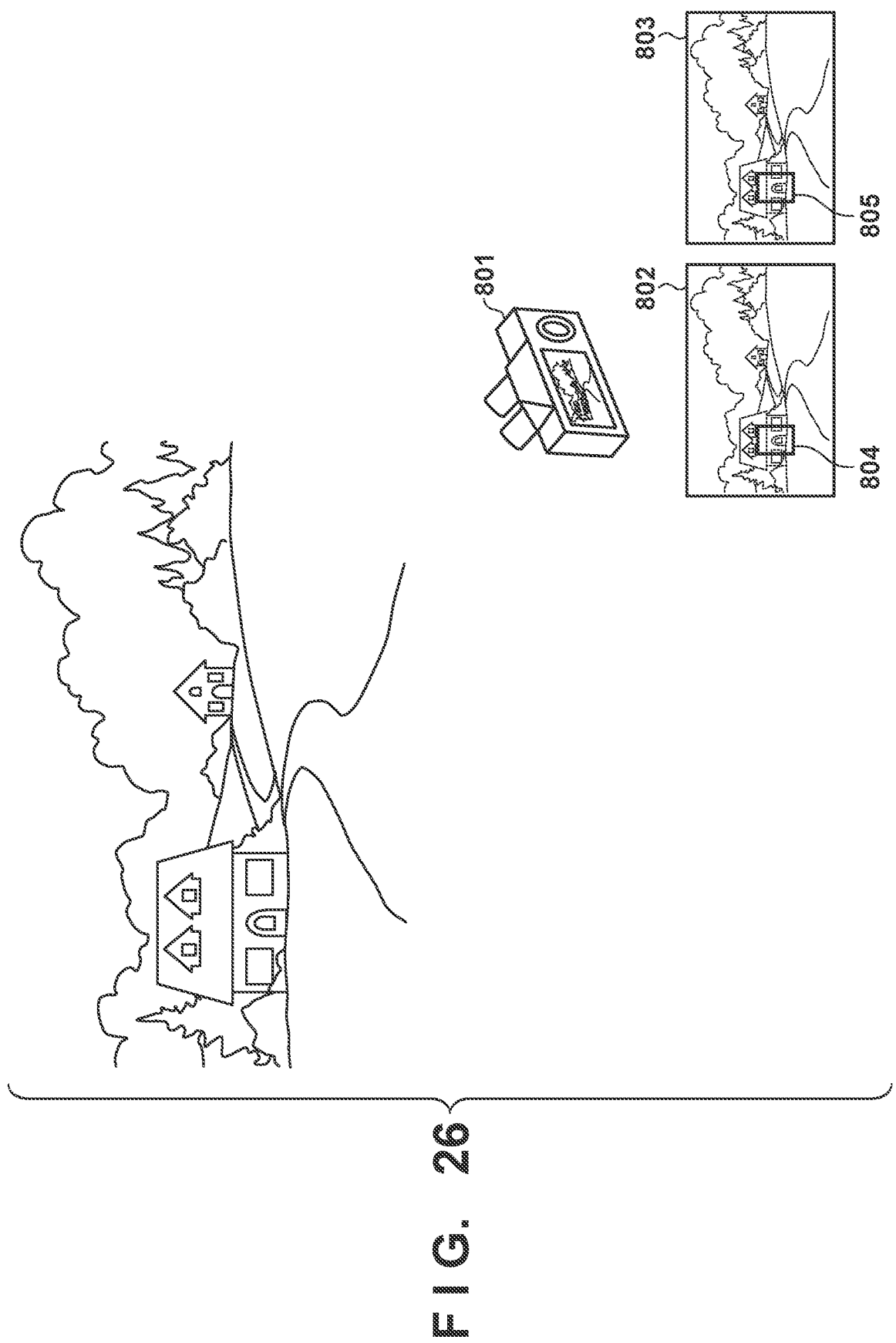
FIG. 26 is a diagram showing a state of window matching for a compound eye stereo camera.

FIG. 26 is a diagram showing a state of stereo matching during calculation of an absolute distance by a compound-eye stereo camera. When the user performs focusing at a position 801 in step S4031, the images taken by the image sensing unit 401 and the image sensing unit 402 are shown as an image 802 and an image 803, respectively. The image 802 is used as a reference image and the image 803 is used as a referring image, and a window (area) 804 and a window 805 are set in the image 802 and the image 803, respectively. The correlation operation between the images in the windows is performed with the window 804 being fixed and the window 805 being moved, and the position of the window 805 having the highest correlation value is determined as the corresponding position to the window 804. Then, by taking a shift amount between the corresponding points on the images as a parallax, an absolute distance to the subject in the window is calculated from the parallax value and the baseline length based on the distance D between the optical axis of the image sensing unit 401 and the optical axis of the image sensing unit 402. At this time, the reliability of the calculated absolute distance is calculated. For example, the position of the window 804 may be moved to various positions, and the position having a relatively high maximum correlation value among correlation values obtained by performing the window matching calculation at the moved positions may be regarded as having high reliability. Further, as will be described later, the reliability may be expressed by the defocus amount with respect to the subject. Here, the window matching method has been described, but the present invention is not limited to this, and feature points may be extracted and associated with each other as in the relative distance calculation by a monocular stereo camera.

In step S4033, the control unit 408 determines whether or not there is substantially the same subject of which both of the relative distance value acquired by the monocular stereo camera and the absolute distance value acquired by the compound-eye stereo camera have high reliability. If there is substantially the same subject with high reliability, the process proceeds to step S4037, and if not, the process proceeds to step S4034.

In step S4034, the relative distance acquired by the monocular stereo camera is converted into an absolute distance by using a feature point near the in-focus position. It is not always the case that there is a subject with high reliability near the in-focus position in the reliability calculation in both the relative distance calculation and the absolute distance calculation, and here, the reliability that allows acquisition of an approximate value of the depth of field is sufficient.

Next, the reliability of the absolute distance acquired by the compound-eye stereo camera is defined by using the defocus amount. For example, the reliability is determined to be the reciprocal of the magnitude of the defocus amount, such that the smaller the defocus amount, the higher the reliability. This makes it possible to move the window 804 at various positions and determine a position at which the reliability is high. If a window 804 is set so as to include candidate points that can be a feature point X among the feature points acquired by the monocular stereo camera, the reliability for the candidate points can be known from the defocus amount. In shooting with the compound-eye stereo camera, if it is assumed that the absolute distance value of the subject whose defocus amount is within the depth of field is highly reliable, if the subject included in the window 804 is within the depth of field, it can be a candidate point for the feature point X.

In step S4035, the control unit 408 sets an aperture to be small so that the candidate points of the feature point X are within the depth of field. With this processing, the candidate points of the feature point X can be captured without blurring, and the absolute distance value can be acquired with high accuracy. When converting the relative distance value to the absolute distance value in step S4034, it is not always the case that a highly reliable feature point is used, it is advantageous to set an aperture smaller than the aperture that the candidate points fall within the depth of field. Here, it is not necessary to set the size of the aperture, and focus point may be adjusted to a position at which the candidate points of the feature point X may be within the depth of field with the size of the aperture remains unchanged. By doing so, even if the shooting scene is too dark to set the aperture small, the candidate points of the feature point X can be shot without blurring.

In step S4036, the control unit 408 calculates the reliability of the absolute distance value with respect to each of the candidate points of the feature point X.

In step S4037, the feature point X is determined from the candidate points of the feature point X. The method of determination may be such that, for example, the position where the total ranking of the reliability calculated by the monocular stereo camera and the reliability acquired by the compound-eye stereo camera is the highest.

In step S4038, the user presses the shutter button 405 to shoot an image.

In step S4039, the absolute distance value of the feature point X is acquired from the two images taken by the compound-eye stereo camera. The method of acquiring the absolute distance value is the same as that described above, but if calculation is performed by window matching, a window as small as possible and including the feature point X may be set. In a case of calculating the absolute distance value by feature point matching, the feature point X in two images may be matched. From step S4039, the process returns to step S404 of FIG. 20.

In step S404, the relative distance value acquired by the monocular stereo camera is converted into an absolute distance value. FIG. 25B is a flowchart showing detailed processing of step S404. Step S404 includes the processes of steps S4041 and S4042.

In step S4041, a conversion formula (conversion relationship) for converting the relative distance values to the absolute distance values for all subjects is calculated by using the relative distance value and the absolute distance value of the feature point X. For example, if the relative distance value of the feature point X is zr and the absolute distance value thereof is Za [m], their relationship can be expressed by $Z=(Za/zr) \times z$. Here, z is the relative distance value of a certain subject, and Z is the absolute distance value of it.

In step S4042, the relative distance values acquired by the monocular stereo camera are converted into absolute distance values using the conversion formula. Here, if the range to be converted is limited to the range of the composition of an image shot in step S4038, the absolute distance values for the composition desired to be acquired by the user can be obtained with high accuracy.

By using the method of the present embodiment, the conversion formula from a relative distance value to an absolute distance value can be determined at the position of the image at which the reliability of the relative distance value is high and the reliability of the absolute distance value is high. Then, by performing conversion on other subjects using the conversion formula, a highly accurate absolute distance values can be obtained for all subjects.

Fifth Embodiment

Next a fifth embodiment of the present invention will be explained.

In the fourth embodiment described above, the image capturing apparatus is configured as a compound-eye stereo camera. By contrast, by using a pupil-divided image sensor, it is possible to eliminate one of the image sensing unit 401 and the image sensing unit 402, thereby the number of the image sensor is reduced to 1, and the structure is simplified.

Figure 27A:
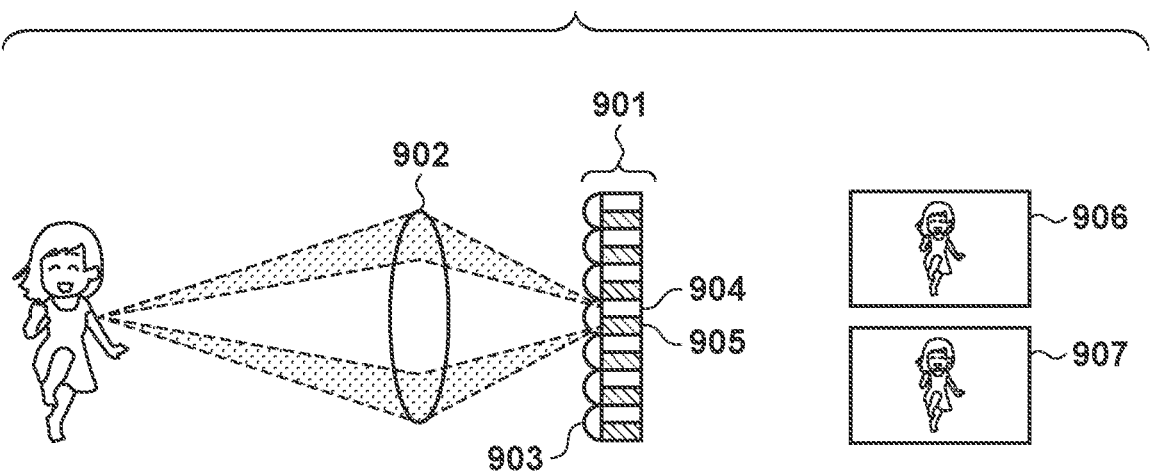
FIGS. 27A and 27B are diagrams showing the structure of a pupil-divided image sensor and the principle of distance calculation.
Figure 27B:
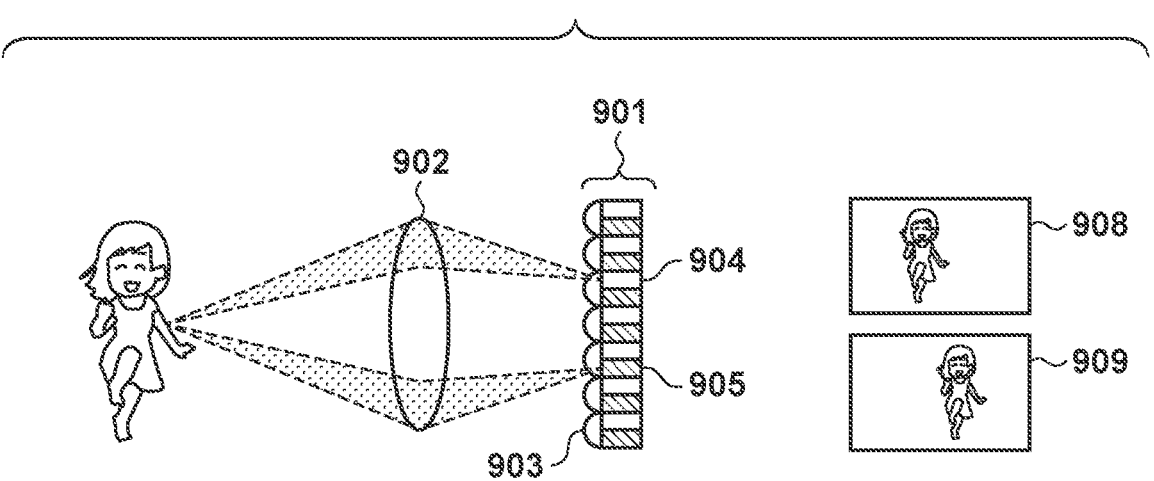

FIGS. 27A and 27B illustrate the structure of the pupil-divided image sensor and the principle of distance calculation. FIG. 27A shows a state in which the subject is in focus, and FIG. 27B shows a state in which the subject is located at a position closer to the image sensor with respect to the in-focus position.

An image sensor 901 has a pupil-divided structure, and the inside of a pixel 903 is divided into a sub-pixel 904 and a sub-pixel 905. Of the light reflected by the subject, one light flux passes through an end portion of an imaging optical system 902 and is received by the sub-pixel 904, and the other light flux passes through an opposite end portion of the imaging optical system 902 and is received by the sub-pixel 905. An image 906 and an image 908 are images generated from the light received by the sub-pixels 904, and an image 907 and an image 909 are images generated from the light received by the sub-pixels 905.

As shown in FIG. 27A, since the light from the subject at the in-focus position is received by the sub-pixel 904 and the sub-pixel 905 of the same pixel, there is no parallax between the subject in the image 906 and the image 907. On the other hand, as shown in FIG. 27B, the light from the subject not at the focus in-position is received by the sub-pixel 904 and the sub-pixel 905 of different pixels, and there is a parallax between the subject in the image 908 and the subject in the image 909. The absolute distance can be calculated from this parallax.

In a case where a pupil-divided image sensor is used, sub-pixels of each pixel share a lens, so the baseline length of the compound-eye stereo camera is determined by the size of the aperture. Therefore, if the aperture is reduced in order to keep the candidate points of the feature point X within the depth of field, the baseline length becomes short and an absolute distance value with high accuracy cannot be obtained. In this case, the reliability of the absolute distance value acquired by the pupil-division image sensor may be adjusted in consideration of both the magnitude of defocus and the baseline length. Further, as described above, the in-focus position may be adjusted to a position where the reliabilities of the candidate points of the feature point X becomes high with the aperture being fixed.

In the above explanation, a method of calculating a highly accurate absolute distance value by matching a relative distance value acquired by the monocular stereo camera with an absolute distance value acquired by the compound-eye stereo camera has been described. In addition, the distance values may be combined.

For example, if it is desired to acquire the absolute distance values of a scene including a moving subject, it is not possible to acquire the relative distance value of the moving subject with a monocular stereo camera. In this case, as the absolute distance value of the moving subject, the absolute distance value acquired by the compound-eye stereo camera may be used as it is.

In a monocular stereo camera, the corresponding points of a subject are calculated using images which are shot at different times, so that the corresponding points may not be found in the case of an image including a moving subject. In addition, it may not be possible to distinguish between the movement of a moving subject and the change in the position and posture of the camera. On the other hand, in the compound-eye stereo camera, since the shooting timings can be controlled the same, a moving subject between the two images can be treated in the same manner as a stationary subject, and the absolute distance value can be calculated. In a case of creating an absolute distance image represented by shading, with respect to a stationary subject, a value obtained by converting a relative distance value acquired by a monocular stereo camera to an absolute distance value at the feature point X extracted from the stationary subject is used. Then, for a moving subject, the absolute distance value acquired by the compound-eye stereo camera is used and synthesized with the absolute distance image by a monocular stereo camera. Whether a subject is a moving subject or not may be determined by using machine learning or the like, or by finding a subject which does not exists in a relative distance image acquired by the monocular stereo camera and exists in an absolute distance image acquired by the compound-eye stereo camera, or by combining these methods.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Applications No. 2021-082597, filed May 14, 2021, No. 2021-079246, filed May 7, 2021, No. 2021-154713, filed Sep. 22, 2021 and No. 2022-052478, filed Mar. 28, 2022 which are hereby incorporated by reference herein in their entirety.

What is claimed is:

1. An image processing apparatus comprising one or more processors and/or circuitry which functions as:
   an acquisition unit that acquires a plurality of different viewpoint images obtained by shooting a same scene from different viewpoints, and acquires at least one parallax image pair having parallax by pupil division;
   a first generator that generates a first distance image from the parallax image pair;
   a second generator that generates a second distance image from the plurality of different viewpoint images; and
   an integrator that integrates the first distance image and the second distance image and generates an integrated distance image,
   wherein the integrator integrates the first distance image and the second distance image by complementing distance information of an area where a subject is moving among distance information constituting the second distance image with distance information of a same area in the first distance image.

2. The image processing apparatus according to claim 1, wherein the integrator integrates the first distance image and the second distance image by complementing distance information of an area excluding an area indicating a distance shorter than a predetermined distance, and an area indicating a predetermined range from an in-focus distance among distance information constituting the first distance image with distance information of a same area in the second distance image.

3. The image processing apparatus according to claim 1, wherein the second generator generates the second distance image based on parallax between the plurality of different viewpoint images.

4. The image processing apparatus according to claim 3, wherein the second generator generates the second distance image using epipolar geometry based on the plurality of different viewpoint images.

5. The image processing apparatus according to claim 1, wherein the acquisition unit acquires a plurality of parallax image pairs obtained by shooting a same scene at different positions, and
   wherein the image processing apparatus further comprises a third generator that generates a plurality of different viewpoint images from the plurality of parallax image pairs.

6. The image processing apparatus according to claim 5, wherein the third generator selects one of the plurality of parallax image pairs as a reference parallax image pair and generates the plurality of different viewpoint images by adding images constituting each of the plurality of parallax image pairs except for the reference parallax image pair pixel by pixel.

7. The image processing apparatus according to claim 5, wherein the third generator keeps one of the plurality of parallax image pairs as a reference parallax image pair as it is, and generates the plurality of different viewpoint images by adding images constituting each of the plurality of parallax image pairs including the reference parallax image pair pixel by pixel.

8. The image processing apparatus according to claim 6, wherein the third generator sequentially shifts selection of the reference parallax image pair among the plurality of parallax image pairs and generates the plurality of different viewpoint images for each of the sequentially selected reference parallax image pairs, and
   wherein the integrator integrates, for each of the sequentially selected reference parallax image pairs, the first distance image generated from the reference parallax image pair and the second distance image generated from the plurality of different viewpoint images corresponding to the reference parallax image pair, and generates a plurality of the integrated distance images.

9. The image processing apparatus according to claim 7, wherein the third generator sequentially shifts selection of the reference parallax image pair among the plurality of parallax image pairs and generates the plurality of different viewpoint images for each of the sequentially selected reference parallax image pairs, and
   wherein the integrator integrates, for each of the sequentially selected reference parallax image pairs, the first distance image generated from the reference parallax image pair and the second distance image generated from the plurality of different viewpoint images corresponding to the reference parallax image pair, and generates a plurality of the integrated distance images.

10. The image processing apparatus according to claim 5, wherein the third generator performs defocus deblurring processing on the plurality of parallax image pairs and generates the plurality of different viewpoint images from the plurality of parallax image pairs undergone the defocus deblurring processing.

11. The image processing apparatus according to claim 10, wherein the defocus deblurring processing includes deconvolution processing or maximum a posteriori (MAP) estimation processing performed by estimating defocus kernel, and deep learning processing by end-to-end processing using an encoder-decoder structure.

12. The image processing apparatus according to claim 1, wherein the acquisition unit acquires a plurality of parallax image pairs obtained by shooting a same scene at different positions,
   wherein the first generator generates the first distance image from each of a plurality of predetermined parallax image pairs among the plurality of parallax image pairs, selects one of a plurality of the generated first distance images as a reference first distance image, changes viewpoints of the first distance images other than the reference first distance image, and integrates the first distance images whose viewpoints are changed with the reference first distance image, and wherein the integrator integrates the integrated first distance image and the second distance image.

13. An image capturing apparatus comprising:
(A) an image processing apparatus comprising one or more processors and/or circuitry which functions as: (1) an acquisition unit that acquires a plurality of different viewpoint images obtained by shooting a same scene from different viewpoints, and acquires at least one parallax image pair having parallax by pupil division; (2) a first generator that generates a first distance image from the parallax image pair; (3) a second generator that generates a second distance image from the plurality of different viewpoint images; and (4) an integrator that integrates the first distance image and the second distance image and generates an integrated distance image; and
(B) an image sensor that shoots the at least one parallax image pair at least as part of the acquisition unit,
wherein the integrator integrates the first distance image and the second distance image by complementing distance information of an area where a subject is moving among distance information constituting the second distance image with distance information of a same area in the first distance image.

14. The image capturing apparatus according to claim 13, wherein the image sensor shoots the at least one parallax image pair after shooting the plurality of different viewpoint images.

15. The image capturing apparatus according to claim 13, wherein the image sensor shoots the plurality of different viewpoint images after shooting the at least one parallax image pair.

16. The image capturing apparatus according to claim 13, wherein the image sensor shoots the plurality of different viewpoint images before and after shooting the at least one parallax image pair.

17. The image capturing apparatus according to claim 13, wherein the image sensor controls an aperture of a diaphragm for shooting the plurality of different viewpoint images to be smaller than that for shooting the at least one parallax image pairs.

18. The image capturing apparatus according to claim 13, wherein the image sensor independently sets shooting conditions for shooting the at least one parallax image pairs and for shooting the plurality of different viewpoint images.

19. An image processing method comprising:
acquiring a plurality of different viewpoint images obtained by shooting a same scene from different viewpoints, and acquiring at least one parallax image pair having parallax by pupil division;
generating a first distance image from the parallax image pair;
generating a second distance image from the plurality of different viewpoint images; and
integrating the first distance image and the second distance image to generate an integrated distance image,
wherein the integrating integrates the first distance image and the second distance image by complementing distance information of an area where a subject is moving among distance information constituting the second distance image with distance information of a same area in the first distance image.

20. A non-transitory computer-readable storage medium, the storage medium storing a program that is executable by a computer, wherein the program includes program code for causing the computer to execute an image processing method, the image processing method comprising:
acquiring a plurality of different viewpoint images obtained by shooting a same scene from different viewpoints, and acquiring at least one parallax image pair having parallax by pupil division;
generating a first distance image from the parallax image pair;
generating a second distance image from the plurality of different viewpoint images; and
integrating the first distance image and the second distance image to generate an integrated distance image,
wherein the integrating integrates the first distance image and the second distance image by complementing distance information of an area where a subject is moving among distance information constituting the second distance image with distance information of a same area in the first distance image.

21. An image processing apparatus comprising one or more processors and/or circuitry which functions as:
an acquisition unit that acquires a plurality of different viewpoint images obtained by shooting a same scene from different viewpoints, and acquires at least one parallax image pair having parallax by pupil division;
a first generator that generates a first distance image from the parallax image pair;
a second generator that generates a second distance image from the plurality of different viewpoint images; and
an integrator that integrates the first distance image and the second distance image and generates an integrated distance image,
wherein the integrator integrates the first distance image and the second distance image by complementing distance information of an area excluding an area indicating a distance shorter than a predetermined distance, and an area indicating a predetermined range from an in-focus distance among distance information constituting the first distance image with distance information of a same area in the second distance image.

22. An image processing method comprising:
acquiring a plurality of different viewpoint images obtained by shooting a same scene from different viewpoints, and acquiring at least one parallax image pair having parallax by pupil division;
generating a first distance image from the parallax image pair;
generating a second distance image from the plurality of different viewpoint images; and
integrating the first distance image and the second distance image to generate an integrated distance image,
wherein the integrating integrates the first distance image and the second distance image by complementing distance information of an area excluding an area indicating a distance shorter than a predetermined distance, and an area indicating a predetermined range from an in-focus distance among distance information constituting the first distance image with distance information of a same area in the second distance image.

* * * * *